United States Patent [19]
Pavlath

[11] Patent Number: 4,997,282
[45] Date of Patent: Mar. 5, 1991

[54] DUAL FIBER OPTIC GYROSCOPE

[75] Inventor: George A. Pavlath, Thousand Oaks, Calif.

[73] Assignee: Litton Systems, Inc., Beverly Hills, Calif.

[21] Appl. No.: 425,461

[22] Filed: Oct. 17, 1989

Related U.S. Application Data

[63] Continuation of Ser. No. 909,784, Sep. 19, 1986, abandoned.

[51] Int. Cl.$^5$ .............................................. G01B 2/02
[52] U.S. Cl. ................................................... 356/350
[58] Field of Search ......................................... 356/350

[56] References Cited

U.S. PATENT DOCUMENTS

| | | | |
|---|---|---|---|
| 3,102,953 | 9/1963 | Wallace | 356/350 |
| 3,395,270 | 7/1968 | Speller | 364/453 |
| 3,411,849 | 11/1968 | Aronowitz | 331/94.5 |
| 3,503,005 | 3/1970 | Mocker | 356/350 |
| 3,512,890 | 5/1970 | McLaughlin | 356/350 |
| 3,625,589 | 12/1971 | Snitzer | 350/96 |
| 3,627,422 | 12/1971 | Chodorow | 250/199 |
| 3,645,603 | 2/1972 | Smith | 350/149 |
| 3,697,887 | 10/1972 | Lee et al. | 331/94.5 |
| 3,743,969 | 7/1973 | Hutchings | 356/350 |
| 3,807,866 | 4/1974 | Zingery | 356/350 |
| 3,827,000 | 7/1974 | Matsushita et al. | 332/7.51 |
| 3,854,819 | 12/1974 | Andringa | 356/350 |
| 4,013,365 | 3/1977 | Vali et al. | 350/106 |
| 4,039,260 | 8/1977 | Redman | 356/106 |
| 4,153,331 | 5/1979 | Cross | 350/96.20 |
| 4,265,541 | 5/1981 | Leclerc et al. | 356/350 |

(List continued on next page.)

FOREIGN PATENT DOCUMENTS

| | | |
|---|---|---|
| 1154955 | 10/1983 | Canada . |
| 1807247 | 9/1971 | Fed. Rep. of Germany ...... 356/350 |
| 3104786 | 9/1982 | Fed. Rep. of Germany . |
| 2566133 | 6/1984 | France . |
| 2068108 | 8/1981 | United Kingdom . |
| 2152207 | 7/1985 | United Kingdom . |

OTHER PUBLICATIONS

Davis, J. L. and Ezekiel, S., "Techniques for Shot-Noise-Limited Inertial Rotation Measurement Using a Multiturn Fiber Square Interferometer", SPIE vol. 157, Laser Inertial Rotation Sensors (1978), p. 131.
Fuji, "Optical Fibers with Very Fine Layered Dielectrics", APP Optics, vol. 25, No. 7, Apr. 1, 1986, pp. 1061–1065.
Kinter, E. C., "Polarization Problems In Optical Fiber Gyroscopes", *Applied Optics*, vol. 18, No. 9, pp. 78–81.
Lefevre et al., "Progress in Optical Fiber Gyroscopes Using Integrated Optics," p. 12.
Ulrich, R., "Polarization Stabilization on Single-Mode Fiber", Applied Phys. Lett. 35(11), 12/01/79.
Pavlath et al., "Fiber Optic Gyroscopes: Advances and Future Developments", Navigation: *Journal of the Institute of Navigation*, vol. 31, No. 2, Summer 1984, pp. 70–83.
Mohr, F. A. & Scholz, U. "Polarization Control for an Optical Fiber Gyroscope", Fiber Optic Rotation and
(List continued on next page.)

*Primary Examiner*—Thomas H. Tarcza
*Assistant Examiner*—Mark Hellner
*Attorney, Agent, or Firm*—Lynn & Lynn

[57] ABSTRACT

A fiber optic gyroscope includes a sensing coil formed of ordinary single mode fiber and a module including polarization maintaining optical fibers. A clockwise beam guided by a polarization maintaining fiber passes through a polarizer before being input to the sensing coil. The polarization module includes means for providing an unpolarized counterclockwise beam to the sensing coil and means for phase modulating a predetermined polarization component. The module also depolarizes the clockwise beam after it has transversed the sensing coil. The clockwise and counterclockwise waves are both unpolarized when they combine in an optical coupler before impinging upon a detector that produces an electrical signal indicative of changes in the interference pattern to indicate rotation of the coil.

49 Claims, 7 Drawing Sheets

U.S. PATENT DOCUMENTS

| | | | |
|---|---|---|---|
| 4,268,116 | 5/1981 | Schmadel et al. | 350/96.29 |
| 4,299,490 | 11/1981 | Cahill et al. | 356/350 |
| 4,372,646 | 2/1983 | strahan et al. | 350/96.31 |
| 4,372,685 | 2/1983 | Ulrich | 356/350 |
| 4,386,822 | 6/1983 | Bergh | 350/96.15 |
| 4,389,090 | 6/1983 | Lefevre | 350/96.29 |
| 4,410,275 | 10/1983 | Shaw et al. | 356/350 |
| 4,456,377 | 6/1984 | Shaw et al. | 356/350 |
| 4,461,574 | 6/1984 | Shaw et al. | 356/350 |
| 4,473,270 | 9/1984 | Shaw | 350/96.15 |
| 4,480,915 | 11/1984 | Arditty et al. | 356/350 |
| 4,494,968 | 1/1985 | Bhagavatula | 65/3.12 |
| 4,529,312 | 7/1985 | Pavlath et al. | 356/350 |
| 4,529,313 | 7/1985 | Petermann et al. | 356/350 |
| 4,529,426 | 7/1985 | Pleibel et al. | 65/3.11 |
| 4,530,097 | 7/1985 | Stokes et al. | 372/6 |
| 4,549,781 | 10/1985 | Bhagavatula et al. | 350/96.30 |
| 4,549,806 | 10/1985 | Marten et al. | 356/350 |
| 4,552,578 | 11/1985 | Anderson | 65/29 |
| 4,557,742 | 12/1985 | Thigpen | 65/2 |
| 4,561,871 | 12/1985 | Berkey | 65/3.11 |
| 4,575,187 | 3/1986 | Howard et al. | 350/96.33 |
| 4,588,296 | 5/1986 | Cahill et al. | 356/350 |
| 4,589,728 | 5/1986 | Dyott et al. | 350/96.30 |
| 4,621,925 | 11/1986 | Masuda et al. | 356/350 |
| 4,671,658 | 6/1987 | Shaw et al. | 356/350 |
| 4,702,600 | 10/1987 | Handrich et al. | 356/350 |
| 4,717,256 | 1/1988 | Ensley et al. | 356/350 |

OTHER PUBLICATIONS

Related Technology, *Springer Verlag*, 1982, pp. 163-168.

Willson et al. "Magnetostrictive Fiber-Optic Sensor System for Detecting DC Magnetic Fields", *Optics Letters*, Jun. 1983, vol. 8, No. 6, pp. 333-335.

Risk et al., "Single-Sideband Frequency Shifting in Birefringent Optical Fiber", vol. 478, *Fiber Optic & Laser Sensors 2 SPIE* (1984), pp. 91-97.

Vali et al., "Fresnel-Fizeau Effect in a Rotating Optical Fiber Ring Interferometer", Applied Optics, 16, 2605, Oct. 1977.

Moss et al., "Photon-Noise Limited Transducer for Gravitational Antenna", Applied Optics, 10, 2495, 1971.

Stone, J. M. "Radiation and Optics", McGraw-Hill, N.Y., 1963, pp. 405-408 and p. 412.

Vali et al., "Ring Interferometer 950 m Long", Applied Optics, vol. 16, No. 2, Feb. 1977, pp. 290-291.

Lamouroux et al., "Polarization Effect in Optical-Fiber Ring Resonators", Optics Letters 1982, vol. 7, No. 8, pp. 391-393.

Cahill et al., "Phase-Nulling Fiber-Optic Laser Gyro", Optics Letters, 1979, vol. 4, No. 3, pp. 93-95.

Cumming, "The Serrodyne Frequency Translator", Proceedings of the IRE, Feb. 1957, pp. 175-186.

Campbell et al., "Rotating-Waveplate Optical-Frequency Shifting in Lithium Niobate", *IEEE Journal of Quantum Electronics*, vol. QE-7, No. 9, Sep. 1971, pp. 450-457.

Gruchmann et al., "Fibre-Optic Polarizers with Extinction Ratio", Optical Communication, Ninth European Conference on Optical Comm.-ECOC 83, 23-26 Oct. 83, pp. 305-308.

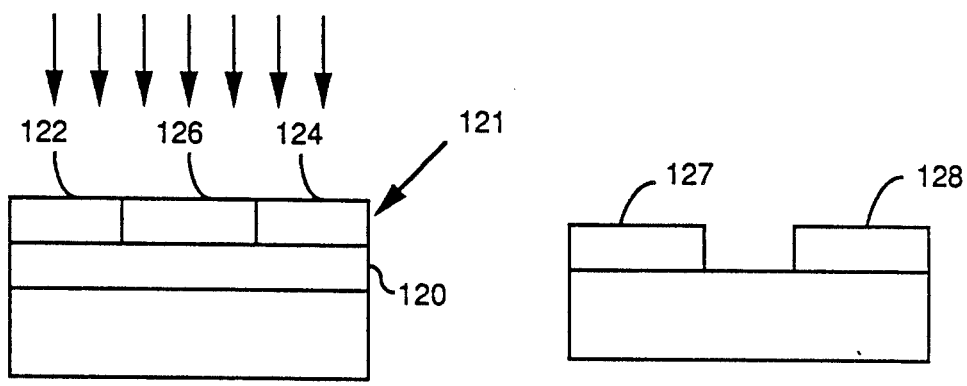
FIG. 8A
FIG. 8B
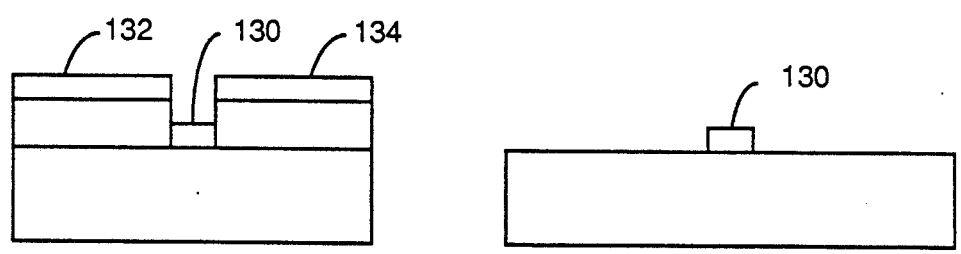
FIG. 8C
FIG. 8D
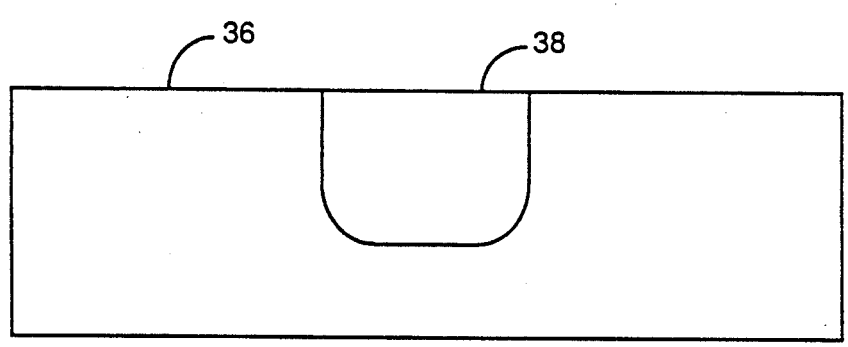
FIG. 8E

DUAL FIBER OPTIC GYROSCOPE

This is a continuation of copending application Ser. No. 909,784 filed on Sept. 19, 1986, now abandoned.

BACKGROUND OF THE INVENTION

This invention relates generally to rotation sensors and particularly to fiber optic rotation sensors. Still more particularly, this invention relates to fiber optic rotation sensors including polarization maintaining optical fiber.

A fiber optic ring interferometer typically comprises a loop of fiber optic material that guides counter-propagating light waves. After traversing the loop, the counter-propagating waves are combined so that they constructively or destructively interfere to form an optical output signal. The intensity of the optical output signal varies as a function of the interference, which is dependent upon the relative phase of the counter-propagating waves.

Fiber optic ring interferometers have proven to be particularly useful for rotation sensing. Rotation of the loop creates a relative phase difference between the counter-propagating waves in accordance with the well known Sagnac effect. The amount of phase difference is a function of the angular velocity of the loop. The optical output signal produced by the interference of the counter-propagating waves varies in intensity as a function of the rotation rate of the loop. Rotation sensing is accomplished by detecting the optical output signal and processing it to determine the rotation rate.

In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper limit to lower limit to be measured is approximately $10^9$.

Some familiarity with polarization of light and propagation of light within an optical fiber will facilitate an understanding of the present invention. Therefore, a brief description of the concepts used to describe the propagation and polarization of a light wave in a fiber will be presented.

An optical fiber comprises a central core and a surrounding cladding. The refractive index of the cladding is greater than that of the core. The diameter of the core is so small that light incident upon the core-cladding interface remains in the core by internal reflections.

It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate with low attenuation are called normal modes. A single mode fiber will propagate only one spatial distribution of energy, that is, one normal mode, for a signal of a given frequency.

In describing the normal modes, it is convenient to refer to the direction of the electric and magnetic fields relative to the direction of propagation of the wave. If only the electric field vector is perpendicular to the direction of propagation, which is usually called the optic axis, then the wave is a transverse electric (TE) mode. If only the magnetic field vector is perpendicular to the optic axis, the wave is a transverse magnetic (TM) mode. If both the electric and magnetic field vectors are perpendicular to the optic axis, then the wave is a transverse electromagnetic (TEM) mode.

None of the normal modes require a definite direction of the field components; and in a TE mode, for example, the electric field may be in any direction that is perpendicular to the optic axis. The direction of the electric field vector in an electromagnetic wave is the polarization of the wave. In general, a wave will have random polarization in which there is a uniform distribution of electric field vectors pointing in all directions permissible for a given mode. If all the electric field vectors in a wave point in only a particular direction, the wave is linearly polarized. If the electric field consists of two orthogonal electric field components of equal magnitude phase shifted by 90 degrees from each other, the electric field is circularly polarized, because the net electric field is a vector that rotates around the propagation direction at an angular velocity equal to the frequency of the wave. If the two linear polarizations are unequal or phased other than 90 degrees from each other, the wave has elliptical polarization. In general, any arbitrary polarization can be represented by the sum of two orthogonal linear polarizations, two oppositely directed circular polarizations or two counter rotating elliptical polarizations that have orthogonal major axes.

The boundary between the core and cladding is a dielectric interface at which certain well-known boundary conditions on the field components must be satisfied. For example, the component of the electric field parallel to the interface must be continuous. A single mode optical fiber propagates electromagnetic energy having an electric field component perpendicular to the core-cladding interface. Since the fiber core has an index of refraction greater than that of the cladding; and light impinges upon the interface at angles greater than or equal to the critical angle, essentially all of the electric field remains in the core by internal reflection at the interface. To satisfy both the continuity and internal reflection requirements, the radial electric field component in the cladding must be a rapidly decaying exponential function. An exponentially decaying electric field is usually called the evanescent field.

The velocity of an optical signal depends upon the index of refraction of the medium through which the light propagates. Certain materials have different refractive indices for different polarizations. A material that has two refractive indices is said to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two different polarizations. Two different polarization components of the same normal mode can propagate through a birefringent material unchanged except for a velocity difference between the two polarizations.

Circular birefringence, linear birefringence, and elliptical birefringence are each described with reference to different polarization modes. If a material exhibits circular birefringence, the polarization of a light wave is expressed as a combination of two counter-rotating components. One of the circular polarizations is referred to as "right-hand circular" while the other is referred to as "left-hand circular". In a non-birefringent material both right hand and left hand circular polarizations travel at the same velocity. The counterrotating electric field vectors of the circularly polarized components of the light represent the polarization modes for circular birefringence. If the light is linearly polarized, the circular polarization vectors are in phase with one another and are of equal amplitude. If the light is elliptically polarized, the circular polarization vectors are of unequal amplitudes or phase. In general, elliptically polarized light may have varying degrees of ellipticity; and the polarization may range from linearly polarized at one extreme to circularly polarized at the other extreme.

In a circularly birefringent material, the velocity of propagation of one circular polarization vector is greater than the velocity of propagation of the counter-rotating polarization vector. Similarly, in a material that is linearly birefringent, the propagation velocity of the light in one of the linearly polarized modes is greater than the propagation velocity of the light in the other normal linearly polarized mode. Elliptical birefringence results when both linear birefringence and circular birefringence exist at a point in a material through which the light wave is propagating. The elliptical birefringence affects the polarization of light in a complex manner which depends, in part, upon the relative magnitudes of the linear birefringence and the circular birefringence.

In summary, any polarized light can be represented by two circularly polarized waves having proper phase and amplitude; two elliptically rotating components or two perpendicular linearly polarized electric field components.

It is well known that to minimize errors in many fiber optic systems it may be desirable to have light of a known polarization state at selected points for input to optical devices whose operation is polarization dependent. The state of polarization is particularly important in some optical fiber rotation sensors. In a fiber rotation sensing system that uses polarized light drift errors due to changes in polarization are determined by the quality of the polarizer.

A linear polarization state in a fiber optic rotation sensor is typically achieved with some type of linear polarizer such as the fiber optical polarizer described in U.S. Pat. No. 4,386,822 to Bergh. The polarization state input to the polarizer is arbitrary in general. The polarizer couples light of undesired polarizations out of the fiber and permits light having only a selected desired polarization to propagate through the fiber. Bergh discloses a fiber optic polarizer including a length of optical fiber mounted in a curved groove in a quartz substrate. The substrate and a portion of the optical fiber are ground and polished to remove a portion of the cladding from the fiber to form an interaction region. The portion of the fiber in the groove is convexly curved as viewed toward the polished surface. The birefringent crystal mounted on the substrate over the interaction region in close proximity to the core of the fiber optical material. The crystal is positioned to partially intersect the path of light propagating in the optical fiber so that evanescent field coupling couples light of undesired polarizations from the optical fiber into the crystal.

Bias error is the primary source of error in using fiber optic Sagnac rings as rotation sensors. The bias of a rotation sensor is the signal output when there is no signal input. If the bias is constant, then it may be subtracted from the output signal when there is a signal input to determine the response of the rotation sensor to the input signal. However, the bias does not remain constant over time and temperature variations.

The principal source of bias error in fiber gyroscopes results from an imperfect polarizer and polarization cross coupling in the fiber. An ideal polarizer should have an infinite extinction ratio. The extinction ratio of a polarizer is the ratio of the intensity of the undesired polarization in the output signal to its intensity in the input signal. This error source was first identified by Kintner, *Opt. Lett.*, Vol. 20, No. 6, p. 154 (1981). Polarization instability manifests itself in optical interferometric systems in a manner analogous to signal fading in classical communications systems.

Fiber optic gyroscopes operating with poalrized light require polarizers having extinction ratios in excess of 100 dB to keep bias errors below 0.01 deg/hr. Previous fiber optic gyroscopes using unpolarized light require extinction ratios in the 60–100 dB range and require the use of high quality polarization maintaining (PM) fiber throughout the gyroscope. Benefits of using PM fiber in fiber optic gyroscopes are reduced polarizer extinction ration requirements and reduced bias error due to the Faraday effect. It is also unnecessary to use active polarization control when PM fiber is used to form the gyroscope. However, PM fiber is so expensive that it is impractical to use it throughout a fiber optic gyroscope.

SUMMARY OF THE INVENTION

The present invention overcomes both the difficulties of signal fading in fiber optic rotation sensors and the cost of using polarization maintaining fiber throughout a rotation sensor. This invention includes a polarization maintaining module which reduces polarizer extinction ratio requirements and eliminates the necessity of using active polarization control. The dual fiber gyroscope according to the invention further includes a sensing coil formed of ordinary single mode fiber, which is much less expensive than the polarization maintaining fiber used in the module.

A Sagnac ring rotation sensor according to the invention includes an optical signal source and a polarization maintaining module arranged to receive signals from the optical signal source. In a first embodiment the invention provides unpolarized clockwise (CW) and counterclockwise (CCW) beams to the sensing coil. In a second embodiment the polarization maintaining module includes means for providing a first polarized optical beam and a second unpolarized beam to a Sagnac ring. The first and second beams may be designated as CW and CCW, respectively. The sensor also includes means for modulating a predetermined polarization component of each beam. A coil of non-polarization maintaining optical fiber forming the Sagnac ring guides the polarized CW beam and the unpolarized CCW beam around a closed path so that rotations of the sensing coil change the interference pattern between the beams. A detector produces an electrical signal indicative of changes in the interference pattern to indicate rotation of the coil.

A Sagnac ring rotation sensor according to the invention may also comprise a length of a first polarization maintaining optical fiber having a pair of principal axes. The rotation sensor may further include means for providing an optical signal to the first polarization maintaining optical fiber. The optical signal has a first linear polarization component parallel to one of the principal axes of the first polarization maintaining optical fiber and a second linear polarization component parallel to the other principal axis. A first polarizer passes light polarized along a polarization axis oriented at a 45° angle to the principal axes of the first polarization maintaining optical fiber and attenuates other polarizations.

An optical coupler couples optical signals between the first polarization maintaining optical fiber and a length of a second polarization maintaining fiber. The second polarization maintaining fiber has principal axes that are parallel to the principal axes of the first polarization maintaining optical fiber. Light coupled into the second polarization maintaining fiber forms a counterclockwise beam and light remaining in first polarization maintaining optical fiber forms a clockwise beam. A third length of polarization maintaining optical fiber; is connected between an optical waveguide and the sensing coil. The optical waveguide is positioned to guide signals between the second polarization maintaining fiber and the third polarization maintaining fiber. The optical waveguide has principal axes oriented at an angle of 45° to the principal axes of the second and third polarization maintaining fibers. The phase of light of a predetermined polarization in the optical waveguide is modulated by a phase modulator placed between a pair of polarizers. The polarizers make the polarization of the clockwise and counterclockwise beams in the optical waveguide have the predetermined polarization before they reach the phase modulator. The optical waveguide is perferably formed in a substrate of lithium niobate and the phase modulator electrodes and adjacent polarizers are preferably positioned over the optical waveguide with the phase modulator between the polarizers.

The method of the invention for forming a Sagnac ring rotation sensor comprises the steps of introducing signals from the optical signal source into a polarization maintaining module and producing unpolarized clockwise and counterclockwise beams and an unpolarized counterclockwise beam output from the polarization maintaining module. The method further includes modulating a predetermined polarization component of light in the polarization maintaining module and connecting a coil of non-polarization maintaining optical fiber to the polarization maintaining module to receive the unpolarized optical clockwise beam and the unpolarized counterclockwise beam.

The method may further include the steps of forming the polarization maintaining module to include a length of a first polarization maintaining optical fiber having a pair of principal axes and providing an optical signal to the first polarization maintaining optical fiber. The optical signal has a first linear polarization component parallel to one of the principal axes of the first polarization maintaining optical fiber and a second linear polarization component parallel to the other principal axis. The method may also include placing a first polarizer that passes light polarized along a first polarization axis and attenuates other polarizations adjacent the first length of polarization maintaining optical fiber with the first polarization axis oriented at a 45° angle to the principal axes of the first poalrization maintaining optical fiber.

The method also includes coupling optical signals between the first polarization maintaining optical fiber and a length of a second polarization maintaining fiber. The second polarization maintaining fiber has principal axes that are parallel to the principal axes of the first polarization maintaining optical fiber. Light coupled into the second polarization maintaining fiber forms a counterclockwise beam and light remaining in first polarization maintaining optical fiber forms a clockwise beam in the sensing coil. The method further include coupling signals from the second polarization maintaining fiber into an optical waveguide having principal axes oriented at an angle of 45° to the principal axes of the second and third polarization maintaining fiber. Signals are coupled from the optical waveguide into a third length of polarization maintaining optical fiber. The method further includes modulating the phase of light having a predetermined polarization in the optical waveguide.

The method further includes polarizing the counterclockwise beam in the optical waveguide such that signals incident upon the phase modulator from the second polarization maintaining fiber have the predetermined polarization; connecting a loop of optical fiber between the optical waveguide and the first polarization maintaining optical fiber to provide a sensing coil for the clockwise beam and the counterclockwise beam; and polarizing the counterclockwise beam in the optical waveguide such that signals incident upon the phase modulator from the sensing coil have the predetermined polarization.

BRIEF DESCRIPTION OF THE DRAWINGS

FIGS. 8A-8E show formation of an optical waveguide in a substrate;

DESCRIPTION OF THE PREFERRED EMBODIMENT

Figure 1:
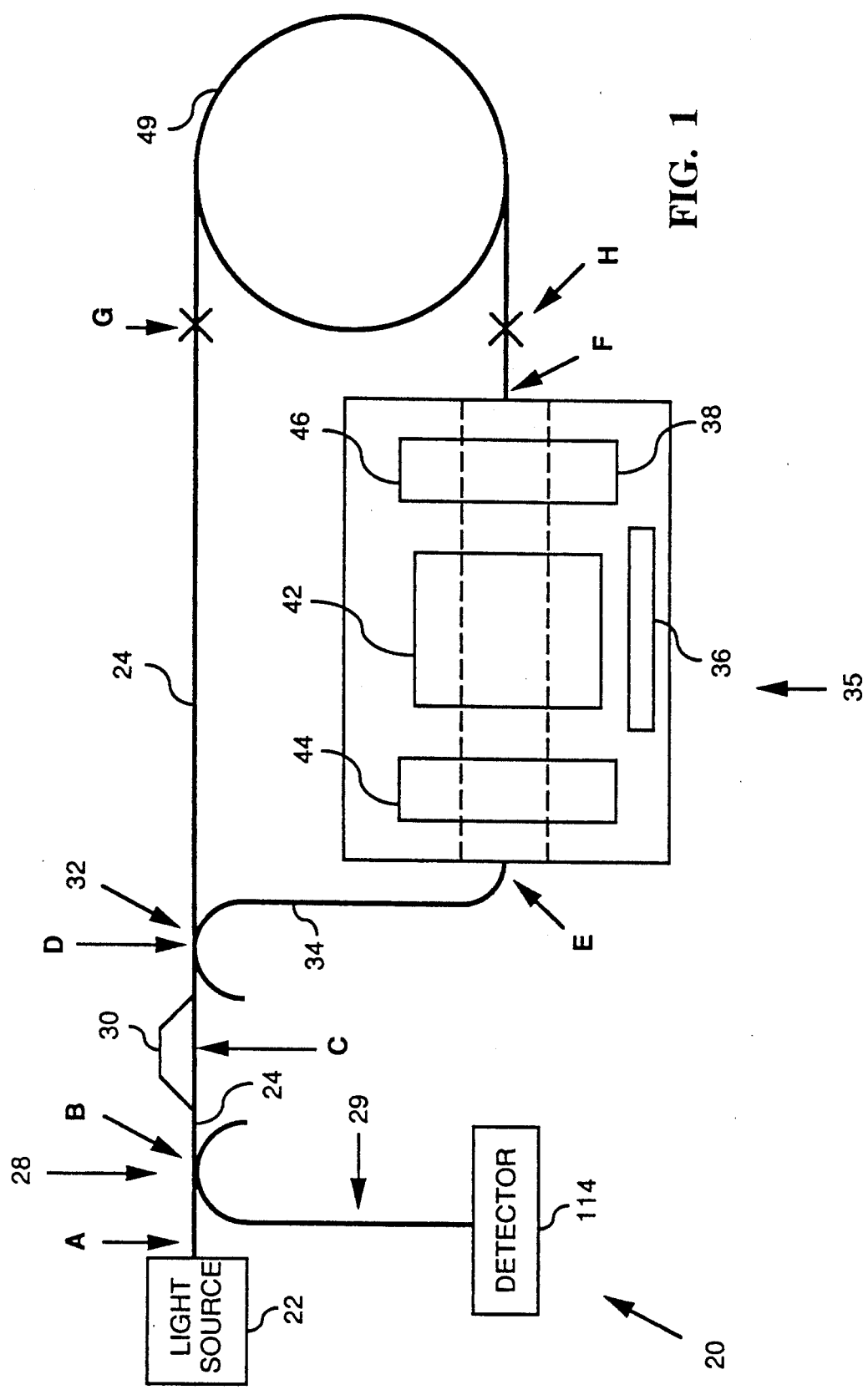
FIG. 1 schematically illustrates the dual fiber optic gyroscope of the present invention.

Referring to FIG. 1, a dual fiber optic gyroscope 20 includes a light source 22, which is preferably a superluminescent diode (SLD) that emits coherent light. The optical output of the light source 22 is input to a PM optical fiber 24 at point A. The optical fiber 24 is preferably a single mode optical fiber. Light input to the fiber 24 then propagates to an optical coupler 28 located at point B in FIG. 1. The coupler 28 couples a portion of the optical signal incident thereon into a PM optical fiber 29. Light remaining in the fiber 24 is incident upon a linear polarizer 30 located at point C.

After traversing the polarizer 30, light in the fiber 24 then reaches a second optical coupler 32 at point D. The optical coupler couples a first portion of the light into a PM optical fiber 34. The light coupled into the fiber 34 forms the counterclockwise beam for the dual fiber optic gyroscope 20. Light that remains in the fiber 24 forms the clockwise beam for the dual fiber optic gyroscope 20.

Figure 9:
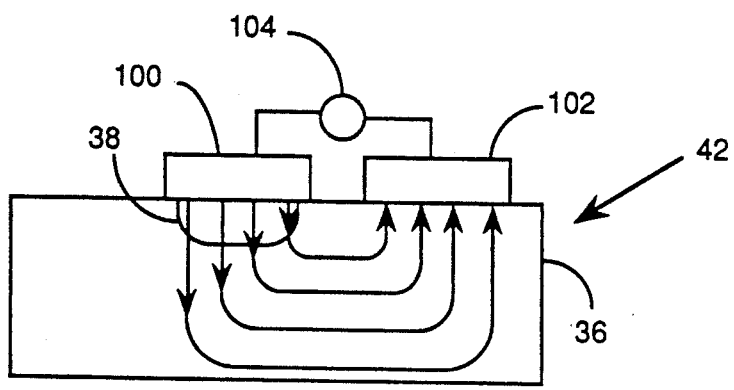
FIG. 9 is a cross sectional view showing a phase modulator formed on a substrate included in the dual fiber optic gyroscope of FIG. 1.
Figure 10:
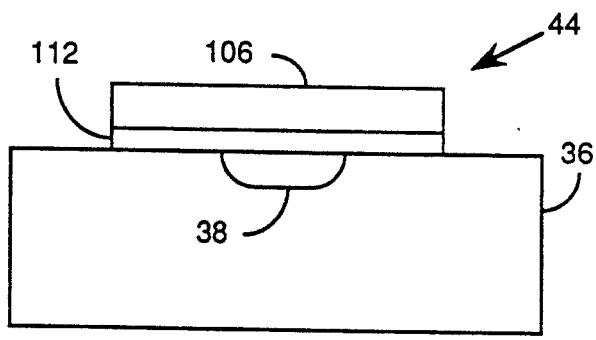
FIG. 10 is a cross sectional view showing a polarizer formed on a substrate included in the dual fiber optic gyroscope of FIG. 1.

The fiber 34 guides the counterclockwise beam to module 35. The module 35 includes a substrate 36 that preferably comprises a lithium niobate chip. An integrated optics waveguide 38, shown in FIGS. 1, 9 and 10 is coupled to the fiber 34 at point E to transmit optical signals therebetween. A phase modulator 42 is fomred on the lithium niobate chip 38 between a pair of polarizers 44 and 46. At point F of FIG. 1 a length of PM fiber 48 is mounted adjacent the integrated optics waveguide 38.

A sensing coil 49 has an end 49A connected to the fiber 34 at point G and an end 49B connected to the PM fiber 48 at point H. The sensing coil preferably includes about 1 km of single mode optical fiber. The connections at points G and H are preferably reflectionless splices.

Figure 13:
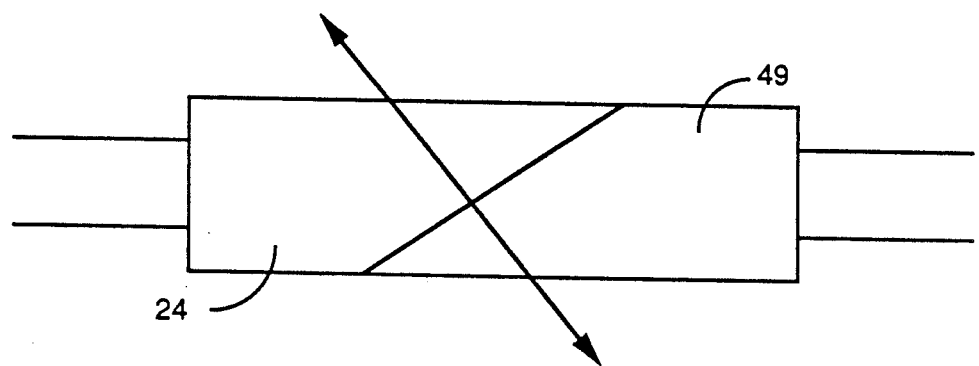
FIG. 13 illustrates a reflectionless splice formed between two optical fibers.

Referring to FIG. 13, a reflectionless splice may be formed by polishing the fiber ends to be joined at angles so that the splice is not perpendicular to the fibers. The angle between the splice and the fibers is selected so that light reflected from the splice strikes the core-cladding boundary at an angle less than the critical angle. Reflected light then exits the fiber and presents no source of error in measurements of rotation rate.

Before describing the method of operation of the dual fiber gyroscope 20, descriptions of the components included in it are presented.

Optical Couplers

Both of the optical couplers 28 and 32 may be of substantially identical structure; therefore, the following description of the optical coupler 28 is applicable to all optical couplers included in the dual fiber optic gyroscope system 20 when the optical fibers 24, 29, and 34 are single mode fibers. For multimode fiber implementations of the dual fiber optic gyroscope 20, suitable multimode couplers (not shown) are well-known in the art.

A type of multimode coupler suitable for forming the sensor in multimode applications described in U.S. Ser. No. 816,881 by John J. Fling. That application is assigned to Litton Systems, Inc., owner of the present invention.

A fiber optic directional coupler suitable for use in single mode applications as the couplers 28 and 32 of FIG. 1 is described in the Mar. 7, 1980 issue of *Electronics Letters.*, Vol. 16, No. 7. pp. 260-261 and in U.S. Pat. No. 4,493,528 issued Jan. 15, 1985 to Shaw et al. That patent is assigned to the Board of Trustees of the Leland Stanford Junior University.

Figure 2:
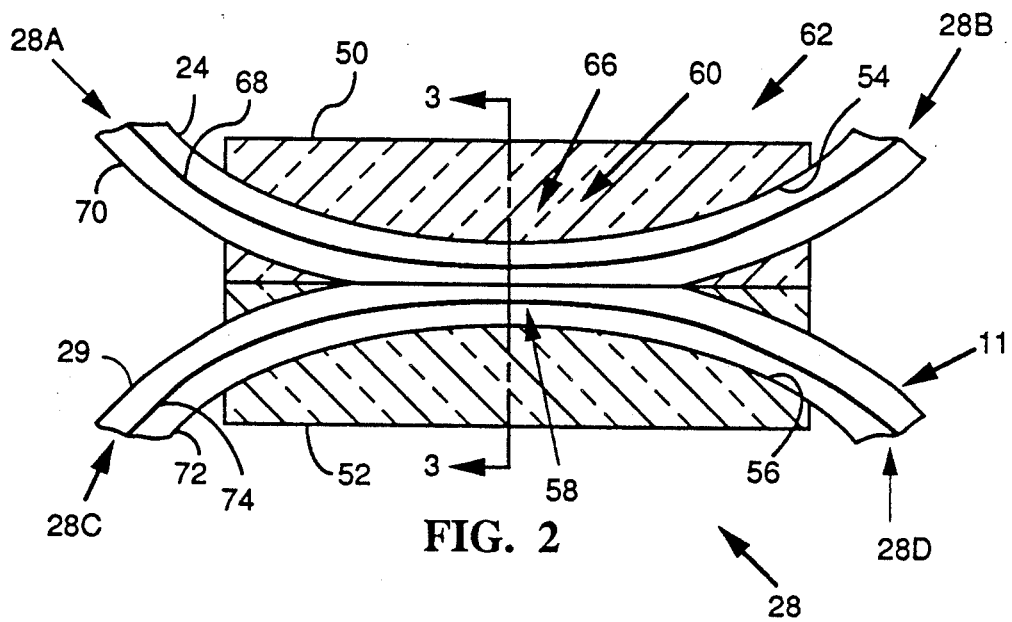
FIG. 2 is a cross sectional view of an optical coupler that may be included in the dual fiber optic gyroscope of FIG. 1.
Figure 3:
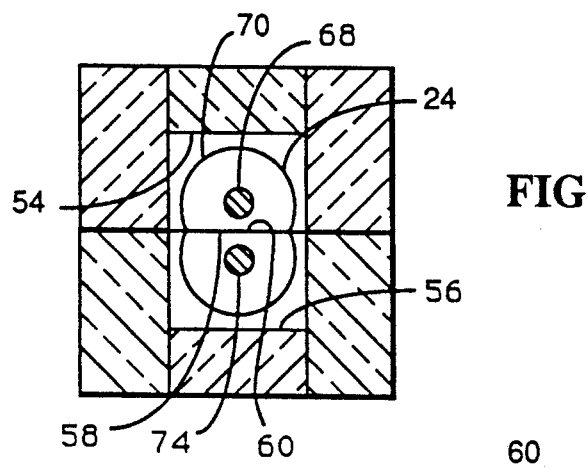
FIG. 3 is a cross sectional view about line 3—3 of FIG. 2.
Figure 4:
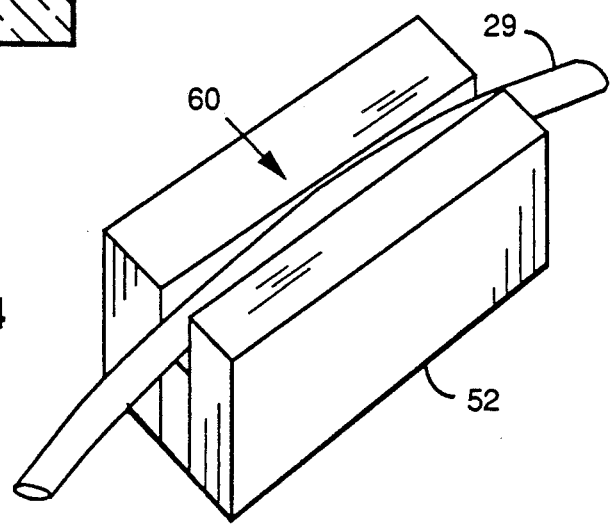
FIG. 4 is a perspective view showing an oval surface on a portion of an optical fiber included in the fiber optic evanescent field coupler of FIGS. 2 and 3.
Figure 5:
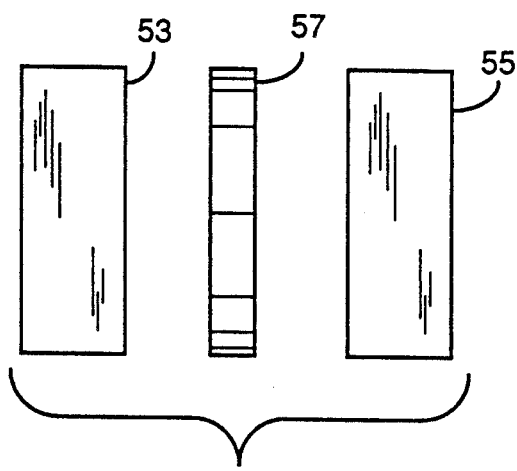
FIG. 5 is an exploded plan view of a substrate that may be included in the fiber optic couplers of FIGS. 2-4.
Figure 6:
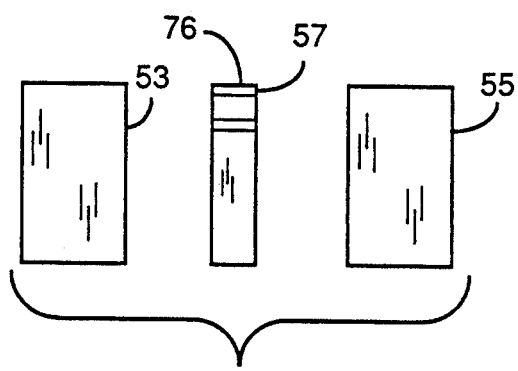
FIG. 6 is an exploded end view of the substrate of FIG. 5.
Figure 7:
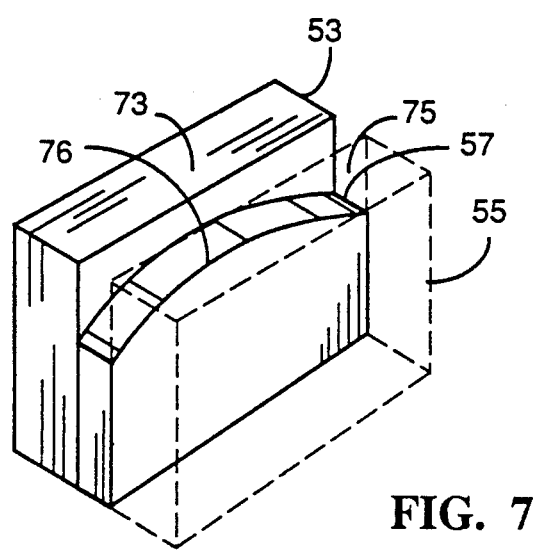
FIG. 7 is a cut away perspective view of the substrate of FIGS. 5 and 6.

As illustrated in FIGS. 2-4, the coupler 28 includes the optical fibers 24 and 29 of FIG. 1 mounted in a pair of substrates 50 and 52, respectively. The fiber 24 is mounted in a curved groove 54 formed in an optically flat surface 58 of the substrate 50. Similarly, the fiber 29 is mounted in a curved groove 56 formed in an optically flat surface 60 of the substrate 52. The substrate 50 and fiber 24 mounted therein comprise a coupler half 62, and the substrate 52 and fiber 29 mounted therein comprise a coupler half 64.

The curved grooves 54 and 56 each have a radius of curvature that is large compared to the diameters of the fibers 24 and 29, which are ordinarily substantially identical. The widths of the grooves 54 and 56 are slightly larger than the fiber diameters to permit the fibers 24 and 29 to conform to the paths defined by the bottom walls of the grooves 54 and 56, respectively. The depths of the grooves 54 and 56 vary from a minimum at the center of the substrates 50 and 52, respectively, to a maximum at the edges of the substrates 50 and 52. The variation in groove depth permits the optical fibers 24 and 29, when mounted in the grooves 54 and 56, respectively, to gradually converge toward the centers and diverge toward the edges of the substrates 50 and 52, respectively. The gradual curvature of the fibers 24 and 29 prevents the occurrence of sharp bends or other abrupt changes in direction of the fibers 24 and 29 to avoid power loss through mode perturbation. The grooves 54 and 56 may be rectangular in cross section; however, other cross sectional configurations such as U-shaped or V-shaped may be used in forming the coupler 28.

Referring to FIGS. 2-4, at the centers of the substrates 50 and 52, the depths of the grooves 54 and 56 are less than the diameters of the fibers 24 and 29. At the edges of the substrates 50 and 52, the depths of the grooves 54 and 56 are preferably at least as great as the fiber diameters. Fiber optic material is removed from each of the fibers 24 and 29 by any suitable method, such as lapping, to form oval-shaped planar surfaces 58 and 60 in the fibers 24 and 29 that are coplanar with the confronting surfaces 58 and 60 of the substrates 50 and 52. The oval surfaces are juxtaposed in facing relationship to form an interaction region 66 where the evanescent field of light propagated by each of the fibers 24 and 29 interacts with the other fiber. The amount of fiber optic material removed increases gradually from zero near the edges of the substrates 50 and 52 to a maximum amount at their centers. As shown in FIGS. 2 and 3 the tapered removal of fiber optic material enables the fibers 24 and 29 to converge and diverge gradually, which is advantageous for avoiding backward reflection and excessive loss of light energy at the interaction region 66.

Light is transferred between the fibers 24 and 29 by evanescent field coupling at the interaction region 66. The optical fiber 24 comprises a central core 68 and a surrounding cladding 70. The fiber 29 has a core 72 and a cladding 74 that are substantially identical to the core 68 and cladding 70, respectively. The core 68 has a refractive index that is greater than that of the cladding 70, and the diameter of the core 68 is such that light propagating within the core 68 internally reflects at the core-cladding interface. Most of the optical energy guided by the optical fiber 24 is confined to its core 68. However, solution of the wave equations for the fiber 68 and applying the well-known boundary conditions shows that the energy distribution, although primarily in the core 68, includes a portion that extends into the cladding and decays exponentially as the radius from the center of the fiber increases. The exponentially decaying portion of the energy distribution within the fiber 68 is generally called the evanescent field. If the evanescent field of the optical energy initially propagated by the fiber 24 extends a sufficient distance into the fiber 29, energy will couple from the fiber 24 into the fiber 29.

It has been found that to ensure proper evanescent field coupling, the amount of material removed from the fibers 24 and 29 must be carefully controlled so that the spacing between the cores of the fibers 24 and 29 is within a predetermined critical zone. The evanescent field extends a short distance into the cladding and decreases rapidly in magnitude with distance outside the fiber core. Thus, sufficient fiber optic material should be removed to permit overlap between the evanescent fields of waves propagated by the two fibers 24 and 29. If too little material is removed, the cores will not be sufficiently close to permit the evanescent fields to cause the desired interaction of the guided waves; and therefore, insufficient coupling will result.

Removal of too much material alters the propagation characteristics of the fibers, resulting in loss of light energy from the fibers due to mode perturbation. However, when the spacing between the cores of the fibers 24 and 29 is within the critical zone, each fiber 24 and 29 receives a significant portion of the evanescent field energy from the other to achieve good coupling without significant energy loss. The critical zone includes the region in which the evanescent fields of the fibers 24 and 29 overlap sufficiently to provide good evanescent field coupling with each core being within the evanescent field of light guided by the other core. It is believed that for weakly guided modes, such as the $HE_{11}$ mode guided by single mode fibers, mode perturbation occurs when the fiber core is exposed. Therefore, the critical zone is the core spacing that causes the evanescent fields to overlap sufficiently to cause coupling without causing substantial mode perturbation induced power loss.

The extent of the critical zone for a particular coupler depends upon a number of factors, such as the parameters of the fibers and the geometry of the coupler. The critical zone may be quite narrow for a single mode fiber having a step index profile. The center-to-center spacing of the fibers 24 and 29 is typically less than two to three core diameters.

The coupler 28 of FIG. 1 includes four ports labeled 28A, 28B, 28C and 28D. Ports 28A and 28B, which are on the left and right sides, respectively, of the coupler 28 correspond to the fiber 24. The ports 28C and 28D similarly correspond to the fiber 29. For purposes of explanation, it is assumed that an optical signal input is applied to port 28A through the fiber 24. The signal passes through the coupler 28 and is output at either one or both of ports 28B or 28D depending upon the amount of coupling between the fibers 24 and 29. The "coupling constant" is defined as the ratio of the coupled power to the total output power. In the above example, the coupling constant is the ratio of the power output at port 28D divided by the sum of the power output at the ports 28B and 28D. The ratio is sometimes called the "coupling efficiency", which is typically expressed as a percent. Therefore, when the term "coupling constant" is used herein, it should be understood that the corresponding coupling efficiency is equal to the coupling constant times 100.

The coupler 28 may be tuned to adjust the coupling constant to any desired value between zero and 1.0 by offsetting the confronting surfaces of the fibers 24 and 29 to control the dimensions of the region of overlap of the evanescent fields. Tuning may be accomplished by sliding the substrates 50 and 52 laterally or longitudinally relative to one another.

The coupler 28 is highly directional, with substantially all of the power applied at one side thereof being output at the ports on the other side. Substantially all of the light applied as an input to either ports 28A or 28C is delivered to ports 28B and 28D without appreciable contra-directional coupling. The directional characteristic is symmetrical in that some light applied to either ports 28B or 28D is delivered to ports 28A and 28B. The coupler 28 is essentially non-discriminatory with respect to polarizations and preserves the polarization of light input thereto.

Light that is cross-coupled from one of the fibers 24 and 29 to the other undergoes a phase shift of $\pi/2$, but light that passes straight through the coupler 28 without being cross-coupled is not shifted in phase. For example, if the coupler 28 has a coupling constant of 0.5, and an optical signal is input to port 28A, then the outputs at ports 28B and 28D will be of equal magnitude; but the output at port 28D will be shifted in phase by $\pi/2$ relative to the output at port 28B.

The Substrates 50 and 52

The substrates 50 and 52 may be fabricated of any suitably rigid material. In one preferred embodiment, the substrates 50 and 52 comprise generally rectangular blocks of fused quartz glass approximately 2.5 cm long, 2.5 cm wide and 1.0 cm thick. The fibers 24 and 29 may be secured in the curved grooves 54 and 56 by a suitable cement (not shown) such as epoxy resin. The fused quartz substrates 50 and 52 advantageously have a coefficient of thermal expansion similar to that of the fibers 24 and 29, which is important in maintaining predetermined coupling characteristics if the substrates 50 and 52 and the fibers 24 and 29 are subjected to any heat treatment during manufacture or use. For some applications the coupler 28 may comprise only the two fibers 24 and 29 with the two oval regions being fused or bonded together without being retained in the substrates 50 and 52.

Referring to FIGS. 3-7, the substrate 52 may be formed from a pair of side laminates 53 and 55 and a center laminate 57. The side laminates 53 and 55 are preferably formed as rectangular parallelepipeds. The center laminate 57 may be formed from a rectangular parallelepiped; however, an edge 76 of the center laminate 57 is machined to form a convex curve. The center laminate 57 preferably has a length of about 0.400 inches and a width of about 0.05 inches. The maximum height of the center laminate 57 is preferably about 0.045 inches. The side laminates 53 and 55 are substantially identical to one another. For example, the side laminate 53 is preferably about 0.400 inches long, about 0.040 inches thick and slightly higher than the 0.045 inch height of the center laminate. It has been found that a height of 0.050 inch is satisfactory for the side laminates 53 and 55.

The coupler is formed by placing the center laminate 57 between the two side laminates 53 and 55. The laminates 53, 55 and 57 are lined up length-wise so that the two larger flat surfaces of the center laminate 57 are held between two of the larger rectangular surfaces of the side laminates 53 and 57. Referring to the FIG. 7, the center laminate 57 is positioned substantially entirely upon the side laminate 53 so that a portion of the side laminate 53 extends beyond the curved edge 76 of the center laminate 57. The side laminate 55 is placed on the center laminate 57 to be symmetrical with the side laminate 53. Since the height of the center laminates is about 0.005 inches greater than the 0.045 inch height of the center laminate, a convex groove is formed between the side laminates 53 and 55.

The three laminates 53, 55 and 57 are positioned together to form the groove 56 and are then clamped tightly together by any conventional clamping means. After the fiber 24 is placed in the groove 56, tension is applied to the fiber so that it conforms to the curvature of the curved groove 56. The laminates 53, 55 and 57 and fiber 24 are then bonded together.

The bonding process to form the coupler halves may simply involve applying a suitable adhesive to the coupler halves in a one-step bonding process. The surfaces 73 and 75 on the laminates 53 and 55, respectively are then lapped util a desired amount of the fiber 24 has been removed to form the interaction region.

Optical couplers are formed by bonding two coupler halves together with the planar portions of the fibers facing one another. The coupler halves may then be bonded together as described above by application of a suitable adhesive to the substrates while they are clamped together. However, a laser fusion method for bonding the fibers 24 and 29 together may produce higher quality couplers for some applications than adhesive bonding.

The coupler 28 may be formed to have a desired coupling constant. One method for assuring achievement of a desired coupling constant includes the step of inputting an optical signal from a laser (not shown) into an end of the fiber 24. The intensities of the optical signals emanating from the fibers 24 and 29 after the input beam has impinged upon the interaction region 66 are monitored using suitable photodetectors (not shown) while the substrates are manipulated to achieve a desired coupling efficiency. The amount of coupling may be varied by moving the substrates to adjust the amount of overlap of the planar fiber surfaces.

After the fibers 24 and 29 have been positioned to provide the desired coupling constant, energy is applied to their interface. The energy source is preferably a $CO_2$ laser (not shown), and it should produce an output beam that will heat the fibers 24 and 29 to a temperature near the glass transition temperature. The energy source may also be an ultrasonic wave generator, an induction heating source or other suitable device for providing the desired amount of heat to the fibers 24 and 29.

The transition temperature is below the melting point of the glass from which the fibers 24 and 29 are formed. The transition temperature depends upon the materials comprising the fibers 24 and 29. Most optical fiber is formed from silicon dioxide with a dopant such as germanium dioxide or boron added thereto to control the refractive index. Such fibers typically have transition temperatures in the range of 1220° C. to 1200° C. The transition temperature should be determined experimentally for the fibers to be joined, and the energy output from the laser 98 should be controlled to assure that the temperature in the bonded region does not exceed the transition temperature. The transition temperature of an optical fiber is attained when the fiber begins to soften as the temperature increases.

Applying the output of the laser over the juncture of the fibers 24 and 29 fuses them together. It has been found that the above described method results in a bonded region having the same physical structure and the same optical characteristics as the material comprising fibers 24 and 29. Accordingly, local irregularities in the refractive indices are avoided, with the resultant interaction region 66 of the joined region having well behaved refractive indices throughout as expected for a molecularly consistent material. The step of coupling light from the fibers 24 and 29 while they are lapped permits sufficient control of the lapping depth fabrication to form the coupler 28 to have a predetermined coupling efficiency.

The Waveguide 38

FIGS. 8A–8E illustrate formation of the optical waveguide 38 in the substrate 36. Initially the substrate 36 is covered with a photoresist layer 120. A glass photomask plate 121 is placed on the photoresist layer 120. The plate 121 is prepared by using standard photoreduction techniques to generate a desired pattern on which portions 122 and 124 are opaque and spaced apart to leave an elongate rectangular portion 126. The arrows in FIG. 8A indicate ultraviolet (UV) light impinging upon the glass plate 121 and the exposed portion 126 of the photoresist layer 120. The portions 122 and 124 are opaque to the UV light so that the UV light affects only the exposed portion 126 fo the photoresist layer 120. Referring to FIG. 8B, placing the photoresist portion 126 in a suitable developer leaves attached to the substrate 12 only a pair of photoresist portions 127 and 128, which were immediately subjacent to the glass plates 122 and 124, respectively.

Referring to FIG. 8C, a titanium layer 130 is formed on the substrate 36 where the photoresist portion 126 was removed therefrom. The titanium layer 130 may be formed by any suitable method, such as evaporation, for forming a thin metallic film. The remaining photoresist portions 77 and 128 also have titanium layers 132 and 134, formed thereon, but the layer 130 has essentially parallel sides sharply defined by the edges of the photoresist layers 77 and 128.

Placing the substrate 36 in a solvent such as acetone removes the photoresist portions 77 and 128, leaving only the well-defined layer 130 of titanium, shown in FIG. 8D, on the substrate 36. The layer 130 has a substantially reactangular cross section as viewed from the end as in FIG. 8D. The substrate 36 with the titanium layer 130 thereon is placed in a high temperature oven, as is well-known in the art, and baked a time sufficient to cause diffusion of Ti+ + ions into the substrate 36 to form the generally rectangular waveguide 38 shown in FIG. 8E.

The Polarizer 30

Figure 11:
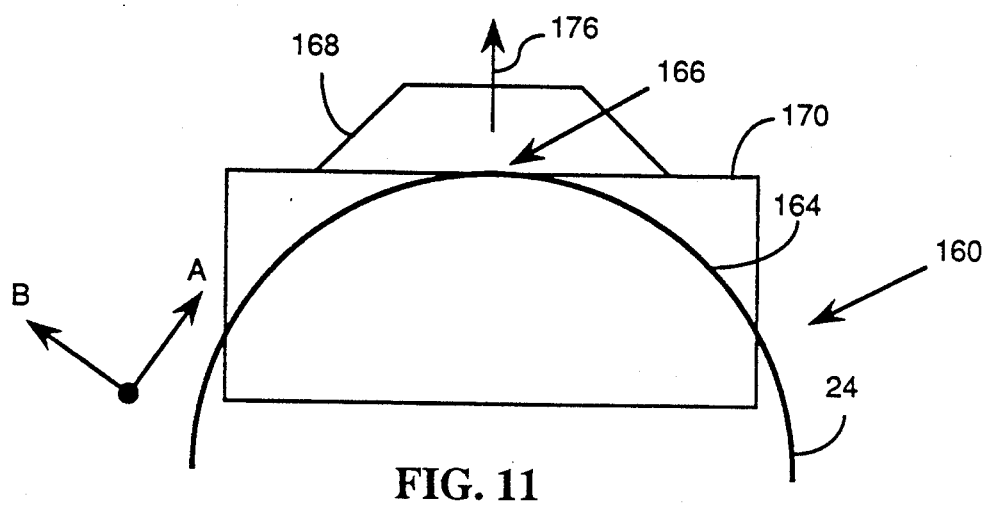
FIG. 11 is a cross sectional view showing a second type of polarizer that may be included in the dual fiber optic gyroscope of FIG. 1.
Figure 12:
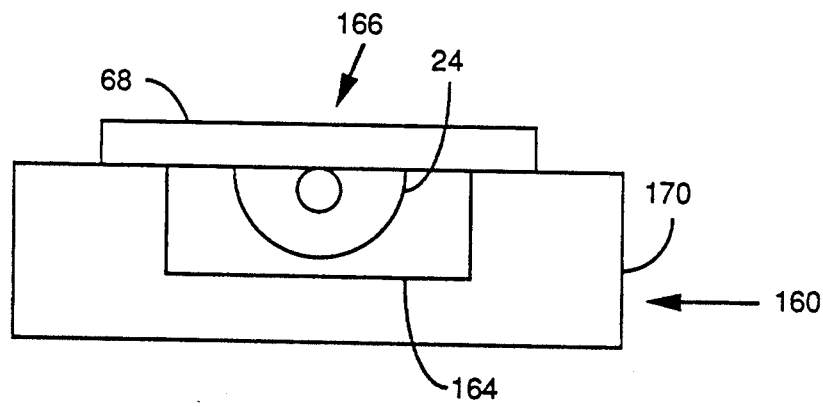
FIG. 12 is a cross sectional view of the polarizer of FIG. 11 showing an optical fiber in a grooved substrate with a birefringent crystal adjacent the fiber.

Referring to FIGS. 11 and 12, the polarizer 30 includes a half coupler 160 that comprises a substrate 162, preferably formed of a quartz block, having a curved groove 164 therein. A length of the optical fiber 24 is secured in the groove 164. A portion of the substrate 160 has been ground and polished down to form a surface 120 that extends into the cladding of the fiber 24. The grinding and polishing operation removes a portion of the cladding to form an interaction region 166. A birefringent crystal 168 having optically flat surface surface 30 is mounted to a surface 170 of the substrate 160. In the interaction region, the evanescent field of light propagating in the fiber 24 interacts with the birefringent crystal 168.

If the fiber 24 is a single mode fiber, then the only modes propagated are those in which the directions of the electric and magnetic fields are approximately perpendicular to the direction of propagation of the wave through the fiber 24. In FIG. 11, the vector A represents the direction of propagation of light through the fiber 24, and the vector 174 represents a polarization perpendicular to the direction of propagation of the light wave. The direction of propagation and the perpendicular polarization are in the plane of the page. The dot at the vertex of the vectors A and B represents a polarization vector parallel to the interface between the fiber 24 and the birefringent crystal 168 at the interaction zone 166 and perpendicular to the plane of the page.

The crystal 168 is arranged so that for light polarized perpendicular to the crystal-fiber interface, the refractive index of the crystal 168 is less than the refractive index of the fiber 168. Therefore, light propagating within the optical fiber 24 with a polarization perpendicular to the crystal-fiber interface remains in the optical fiber 24 because of total internal reflections at the crystal-fiber interface. The index of refraction of the crystal 168 for polarizations parallel to the crystal-fiber interface is chosen to be greater than the index of refraction of the optical fiber 24 so that light polarized parallel to the crystal-fiber interface couples out of the optical fiber 24 into the birefringent crystal 168.

The polarizer 30 described herein is essentially identical to the polarizer disclosed in U.S. Pat. No. 4,386,822 to Bergh.

The Phase Modulator 42

Referring to FIG. 9, the phase modulator 42 includes a pair of electrodes 100 and 102 formed on the lithium niobate chip 36. The electrode 100 is directly over the waveguide 8, and the electrode 102 is laterally displaced from the electrode 100. A voltage source 104 is connected to the electrodes 100 and 102 to form an electric field in the waveguide 38.

As shown in FIG. 9, the electric field is primarily vertical in the the waveguide 38. The waveguide 38 has a refractive index $n = n_0 + n_1$ (E), where $n_0$ is a constant component of the refractive index and $n_1$ (E) is a function of the applied electric field E. Since the electric field in the waveguide 38 is essentially in the vertical direction as viewed in FIG. 10, only the vertical component of the field affects the refractive index. Changes in the refractive of the waveguide 38 cause its effective optical length to change. Therefore, controlling the electric field provides means for controlling the time required for a light wave to travel in the waveguide 38 under the electrode 100. This change in transit time may be viewed as a change in phase of the wave. Since the phase modulator 42 modulates the phase of signals polarized along the crystal principal axis asymmetrically in the waveguide 38, only waves polarized along one principal axis of the waveguide 38 are allowed to enter the phase modulator 42.

The Polarizers 44 and 46

Since the polarizers 44 and 46 are preferably essentially identical, only the polarizer 44 is described in detail herein. Referring to FIG. 10 a metal strip 106 is placed on the lithium niobate chip 36 over the waveguide 36. The metal strip 106 is preferably formed of aluminum. A dielectric buffer layer 112 is placed between the strip 106 and the lithium niobate chip 36. The polarizer 44 passes the horizontally polarized component of incident light and attenuates the vertically polarized component.

Polarization Maintaining Fiber

A polarization maintaining fiber has refractive indices that differ significantly for different polarizations. Since the light input to the fiber 16 has polarization components along both of the fiber axes, both of these polarizations will propagate in the fiber without mixing together. The polarization polarization maintaining fibers 24, 34 and 40 may be formed by a variety of techniques described subsequently. Since all of the polarization maintaining fibers may be essentially identical, the subsequent description of such fibers refers only to the fiber 24.

Since the velocity of light in the fiber 24 is $v = c/n$, where c is the speed of light in a vacuum and n is the refractive index of the fiber for the particular polarization under consideration, the two polarizations have different velocities in the fiber. The slow wave has velocity $v_s = c/n_1$, and the fast wave has velocity $v_f = c/n_2$, where $n_2 < n_1$.

Figure 15:
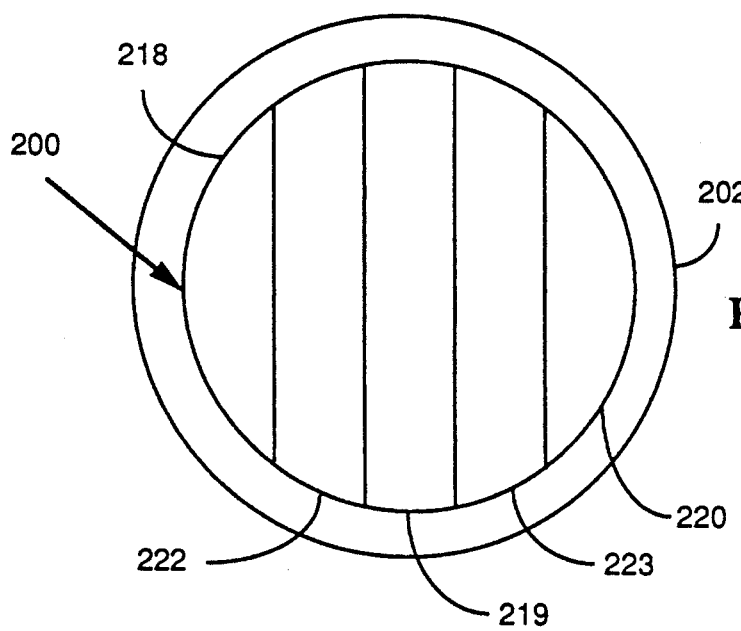
FIG. 15 is a cross sectional view of a polarization maintaining optical fiber.

One type of polarization maintaining fiber has a layered core 200 and a surrounding cladding 202 as shown in FIG. 15. The core 200 has different refractive indices for waves of different polarization so that the propagation constants of the core are polarization-dependent. The cladding 202 preferably has a refractive index that is less than both of the core refractive indices. The core 200 and cladding 202 may have refractive indices such that the cladding index is greater than one core index and less than the other. Such fibers are sometimes called polarizing fibers. Light incident upon an interface between two dissimilar dielectrics from the material having the greater refractive index will be internally reflected if the angle of incidence is less than a critical angle. Therefore, the polarization maintaining fiber guides light of both polarizations. Since the propagation constants of the core are different, or non-degenerate, for the two polarizations, energy does not readily couple between them. Therefore, light propagated by the polarization maintaining fiber 24 experiences no change in polarization.

Figure 16:
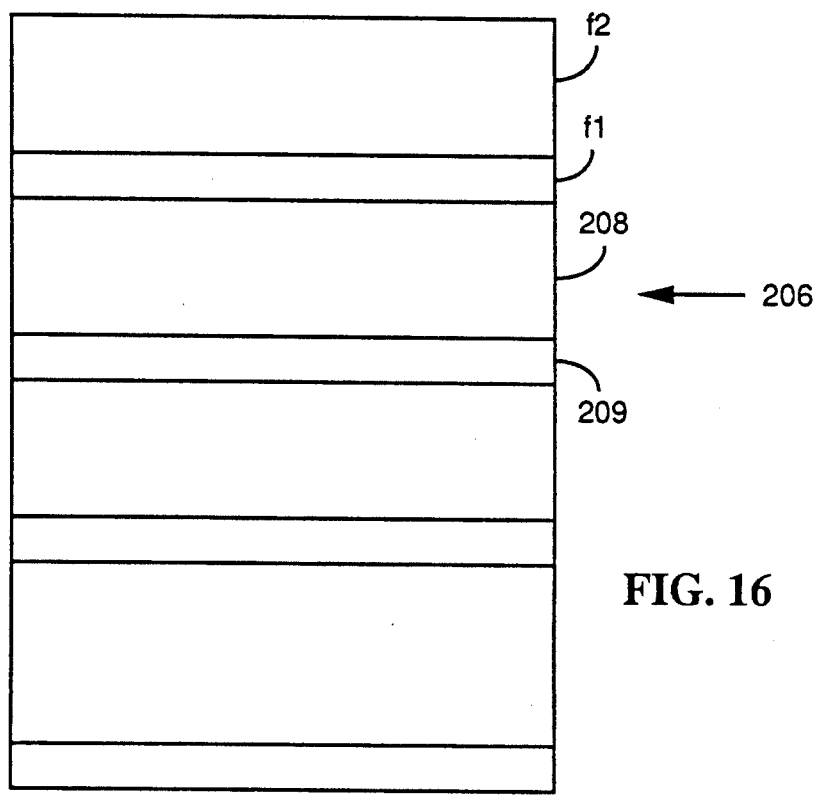
FIG. 16 illustrates a stack of layers of two dielectrics having different thicknesses and different refractive indices.

A core having birefringent properties can be synthesized by properly choosing materials for the layers 208 and 207 to have particular refractive indices and by properly choosing the fractional thicknesses $f_1$ and $f_2$ as shown in FIG. 16. Referring to FIG. 15, the core 200 is comprised of layers 218–220 of a first material and layers 222 and 223 of a second material having an index of refraction different from the first material. The core 200 may comprise many layers of the two materials, but only the five layers 218–220 and 222 and 223 are shown for convenience of illustration and explanation.

The core 200 is shown to be circular in cross section, as in most optical fibers. The materials comprising the core 200 and cladding 202 are chosen such that the core indices of refraction for polarization along the z-axis and the y-axis are greater than the index of the cladding 202. Therefore, a wave polarized along the z-direction input to the form fiber 24 will remain polarized in the z-direction.

Unlike ordinary optical fibers, the form birefringent single mode fiber 24 will maintain the polarization state of a wave propagating therein. In the fiber 24 the difference between the refractive indices for the two polarizations is sufficiently large that there is a substantial difference between the propagation constants of waves having the two orthogonal polarizations. The difference between the propagation constants eliminates the degeneracy between the polarization states and prevents waves of one polarization from coupling to the other polarization under ordinary conditions. Coupling of energy between waves requires that the waves have essentially the same velocity. If the velocities are different, there is no appreciable coupling between the two states.

Referring to FIG. 16, a method of fabricating a polarization maintaining fiber as shown in FIG. 15 involves first forming a stack 206 of alternating layers of materials 208 and 209 having different refractive indices. The stack 206 is heated to form an essentially monolithic block. The block may then be drawn through a succession of dies, or otherwise stretched by methods well-known in the art, to reduce its dimensions to values suitable for use as the core 200. Before drawing, the block may be ground to form a cylinder in order to produce a core having a circular cross section. A cladding having a refractive index less than both refractive indices of the core 200 may be added thereto by any of several standard techniques, such as fusing bulk silicon dioxide, $SiO_2$, onto the core, collapsing $SiO_2$ tubing onto the core, or by reactive deposition of $SiO_2$ from a gaseous mixture.

$GeO_2(n_2=1.593)$ may be used as the high index component and $SiO_2$ as the low index component in the stack 206. Both silica and germania are used in virtually all single mode and multimode fibers because of their low loss and physical compatibility. Combined inhomogeneously with proper fractional thickness they form the core 20 with both $n_z$ and $n_y$ being large enough to be clad by fused silica.

Well established optical fabrication techniques can be used to fabricate the $SiO_2$ plates from pure bulk $SiO_2$. The $GeO_2$ component may be too thin to be formed by mechanical fabrication techniques. The $GeO_2$ layer may be formed by sputtering a $GeO_2$ film onto an $SiO_2$ substrate. The $GeO_2$ layer may also be formed by coating the $SiO_2$ with a layer of Ge and oxidizing it to $GeO_2$ in a tube furnace.

Other types of high birefringence fiber suitable for use as the polarization maintaining fiber 24 are disclosed in the following U.S. Patents:

U.S. Pat. No. 4,549,781 issued Oct. 29, 1985 to Bhagavatula et al. for Polarization-Retaining Single-Mode Optical Waveguide;

U.S. Pat. No. 4,529,426 issued July 16, 1985 to Pleibel et al. for Method of Fabricating High Birefringence Fibers;

U.S. Pat. No. 4,465,336, issued Aug. 14, 1984 to Huber et al. for Waveguide and Method of Manufacturing Same; and U.S. Pat. No. 4,561,871 issued Dec. 31, 1985 to Berkey for Method of Making Polarization Preserving Optical fiber.

Method of Operation

The benefits of using RM fiber can be realized when the PM fiber is used only in the sections of the dual fiber optic gyroscope between points A and G and A and H. The fiber sensing coil 49 is still made of low cost, single mode fiber. Thus, the dual fiber optic gyroscope 20 has the advantages of PM fiber and the low cost of single mode fiber.

Figure 14:
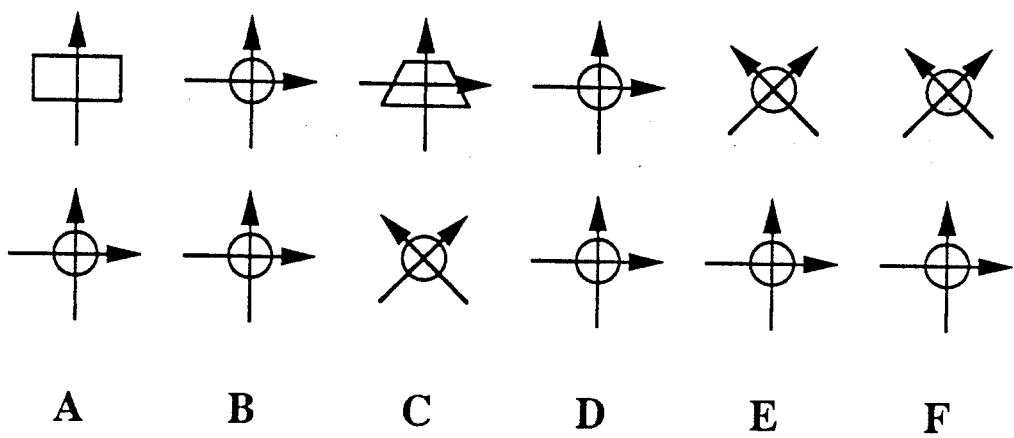
FIG. 14 illustrates the polarization of the optical signals and the principal axis at points A-F of FIG. 1.

Referring to FIG. 1, light from the SLD 22 (or other broadband source) is coupled into the fiber 24 at point A. The direction of polarization of the light output from the SLD 22 is aligned with one of the principal axes of the fiber 24 as shown in FIG. 14. Since the SLD 22 also emits an unpolarized optical component, some of this unpolarized light light is coupled into the other principal axis of the fiber 24. The principal axes of the fibers 24 and 29 at point B in the coupler 28 are aligned with one another to prevent polarization coupling. Coupler 28 preferably cross couples 50% of the light incident thereon from one of the fibers 24 and 29 into the other fiber. The signals that propagate in the two principal axes to the polarizer 30 located at C are uncorrelated. The signals are decorrelated in the PM fiber 24 between points A to C, and there is essentially no crosscoupling between points A and C.

The polarizer 30 passes the vertically polarized component of the light signal input thereto and attenuates the horizontal component of light. The principle axis of the fiber 24 is oriented at an angle of 45° with respect to the axis of the polarizer 30. Essentially all the light leaving the polarizer 30 at point C is evenly split between the two principle axes of the fiber 24. The correlation between the light waves having the two polarizations is greatly reduced if the distance between points C and D is greater than one depolarization length. The depolarization length is a function of the fiber group velocity dispersion and source bandwidth. Ordinarily the depolarization length is about 12 cm. The distance between points C and D may therefore be about 25 cm.

The coupler 32 at point D splits the wave into the clockwise (CW) and counterclockwise (CCW) waves. The principal axes of the fibers 32 and 34 at point D of the coupler 32 are aligned, hence the correlation between the waves in the principal axes is kept low.

The CW wave passes from the PM fiber 24 to at point G to the single mode sensing coil 49. After propagating through the sensing coil 49, the CW wave enters the PM fiber 48 at point H. The CW and CCW waves are essential unpolarized in the sensing coil 49.

If the dual fiber optic gyroscope 20 were run open loop, then the PM fiber would run from point H to the coupler 32. As shown in FIG. 1, the phase modulator, which is polarization sensitive, is used for closed loop operation. The PM fibers 34 and 48 are mounted to the $LiNbO_3$ chip 36 at points E and F, respectively. The principal axes of the PM fibers 34 and 48 are oriented parallel to each other and at an angle of 45° to principal axes of the optical waveguide 38. The two polarizers 44 and 46 on the chip 36 select the component of polarization along the most sensitive axis of the phase modulator. This axis is shown to be the vertical axis, but the horizontal axis could be satisfactorily used.

The CW light is polarized at polarizer 46, phase modulated by the phase modulator 42, and injected into the PM fiber 34 at point E. Since the light is reinjected at 45° to the principal axes of the fiber 34, both polarization modes are equally excited; and the light becomes unpolarized if the distance between points D and E is greater than one depolarization length.

The CCW light is polarized by polarizer 44, phase modulated by the phase modulator 42, and injected into the PM fiber 48 at point F. The polarization of the light at point F is at an angle of 45° to the principal axes of the fiber 48.

The CW propagating light is depolarized if the distance between points F and H is greater than one depolarizaton length. The CCW propagating light is injected into the single mode fiber sensing loop 49 at point H. The CCW wave then propagates to G where it is injected into the PM fiber 24, which guides the CCW wave to the coupler 32 at point D. The CW and CCW waves are superimposed at point D. The superimposed waves, propagate to point C where half the light passes through the polarizer 30. Light that passes through the polarizer 30 then propagates to point B where half the light is coupled into the fiber 29, which guides the signal to a photodetector 90.

The closed loop dual fiber optic gyroscope 20 system described herein has an additional 9 dB loss due to the depolarization-polarization process. If the system is run open loop, then the additional loss is only 6 dB.

Referring to FIG. 1, if the phase modulator 42 is of a polarization insensitive type, then the polarizers 44 and 46 can be eliminated. In this case, the PM fiber 34 may be aligned arbitrarily with the axes of the phase modulator 42. The PM fiber 48 from points F to H is eliminated, and the single mode fiber sensing coil is spliced directly to the phase modulator 42. This configuration has an additional 6 dB of loss.

The dual fiber optic gyroscope 20 will also function properly as a rotation sensor if one beam, e.g. the CW beam is polarized in the sensing coil and the other is unpolarized. Referring to FIGS. 1 and 14, rotating the fiber 24 so that at point C the fiber principal axes are aligned parallel to the axis of the polarizer 30 causes the CW beam provided to the sensing loop 49 to be polarized. The CCW beam will still be depolarized by the module 35 before the beam enters the sensing loop 49. The CW beam will be depolarized while propagating through the fiber 48 and the module 35. Therefore, the waves that combine in the coupler 30 to produce the optical output of the system 10 are unpolarized.

Frequency shifters of both polarization sensitive and insensitive or model sensitive or insensitive can be used in place of the phase modulator. If a polarization or modal sensitive frequency shifter is used, then there exists an additional 9 dB loss. If the frequency shifter is polarization or modal insensitive, the additional loss is reduced to only 6 dB.

The following conditions on the lengths of the fibers of FIG. 1 preferably are satisfied to avoid noise due to coherent Fresnel reflections:

$|DG-DE| < L_{coh}$;

$|EF| < L_{coh}$;

$|FH| < L_{coh}$;

$|DG-DF| < L_{coh}$; and $|DG-DH| < L_{coh}$.

These conditions are easily met in practice since the coherence length, $L_{coh}$, is about 50 μm for typical superluminescent diodes.

What is claimed is:

1. A Sagnac ring rotation sensor, comprising:
   a length of a first polarization maintaining optical fiber having a pair of principal axes;
   means for providing an optical signal to the first polarization maintaining optical fiber, the optical signal having a first linear polarization component parallel to one of the principal axes of the first polarization maintaining optical fiber and a second linear polarization component parallel to the other principal axis;
   a first polarizer coupled to the first polarization maintaining fiber for passing light polarized along a first polarization axis and attenuating other polarizations, the first polarization axis being oriented at a 45° angle to the principal axes of the first polarization maintaining optical fiber;
   a length of a second polarization maintaining fiber optically coupled to the first polarization maintaining optical fiber, the second polarization maintaining fiber having principal axes that are parallel to the principal axes of the first polarization maintaining optical fiber, light coupled into the second polarization maintaining fiber forming a counterclockwise beam and light remaining in first polarization maintaining optical fiber forming a clockwise beam;
   a third length of polarization maintaining optical fiber;
   an optical waveguide positioned to guide signals between the second polarization maintaining fiber and the third polarization maintaining fiber, the optical waveguide having principal axes oriented at an angle of 45° to the principal axes of second polarization maintaining fiber;
   means for modulating the phase of light having a predetermined polarization in the optical waveguide;
   first polarizing means for polarizing the counterclockwise beam in the optical waveguide such that signals incident upon the phase modulator from the second polarization maintaining fiber have the predetermined polarization;
   a loop of optical fiber connected between the optical waveguide and the first polarization maintaining optical fiber to provide a sensing coil for the clockwise beam and the counterclockwise beam; and
   second polarizing means for polarizing the counterclockwise beam in the optical waveguide such that signals incident upon the phase modulator from the sensing coil have the predetermined polarization.

2. The rotation sensor of claim 1, wherein the optical waveguide is formed in a substrate of lithium niobate.

3. The rotation sensor of claim 2 wherein the first and second polarizing means and the phase modulator are mounted on the lithium niobate substrate adjacent the optical waveguide with the phase modulator being between the first and second polarizing means.

4. The rotation sensor of claim 1 wherein the sensing loop comprises ordinary single mode, non-polarization maintaining fiber.

5. A Sagnac ring rotation sensor, comprising:
an optical signal source;
a polarization maintaining module arranged to receive optical signals from the optical signal source, the polarization maintaining module including:
an integrated optics waveguide;
means for providing an unpolarized optical clockwise beam and an unpolarized counterclockwise beam in the integrated optics waveguide; and
means for modulating a single polarization component in the integrated optics waveguide;
a coil of non-polarization maintaining optical fiber forming a sensing coil connected to the means for providing an unpolarized optical clockwise beam and an unpolarized counterclockwise beam; and
means for detecting interference between the clockwise beam and the counterclockwise beam to measure rotation of the coil.

6. The rotation sensor of claim 1, wherein the optical waveguide is formed in a substrate of lithium niobate, the first and second polarizing means and the phase modulator being mounted on the lithium niobate substrate adjacent the optical waveguide with the phase modulator being between the first and second polarizing means.

7. The rotation sensor of claim 5 wherein the sensing loop comprises ordinary single mode, non-polarization maintaining fiber.

8. A method for forming a Sagnac ring rotation sensor, comprising the steps of:
introducing an optical signal into a first length of polarization maintaining optical fiber, the optical signal having a first linear polarization component parallel to one of the principal axes of the first polarization maintaining optical fiber and a second linear polarization component parallel to the other principal axis;
placing a first polarizer that passes light polarized along a first polarization axis and attenuates other polarizations adjacent the first length of polarization maintaining optical fiber;
orienting the first polarization axis at a 45° angle to the principal axes of the first polarization maintaining optical fiber;
coupling optical signals between the first polarization maintaining optical fiber and a length of a second polarization maintaining fiber, the second polarization maintaining fiber having principal axes that are parallel to the principal axes of the first polarization maintaining optical fiber, light coupled into the second polarization maintaining fiber forming a counterclockwise beam and light remaining in first polarization maintaining optical fiber forming a clockwise beam;
coupling signals from the first polarization maintaining fiber into an optical waveguide having principal axes oriented at an angle of 45° to the principal axes of second polarization maintaining fiber;
coupling signals from the optical waveguide into a third length of polarization maintaining optical fiber; and
modulating the phase of light having a predetermined polarization in the optical waveguide;
polarizing the counterclockwise beam in the optical waveguide such that signals incident upon the phase modulator from the second polarization maintaining fiber have the predetermined polarization;
connecting a loop of optical fiber between the optical waveguide and the first polarization maintaining optical fiber to provide a sensing coil for the clockwise beam and the counterclockwise beam; and
polarizing the counterclockwise beam in the optical waveguide such that signals incident upon the phase modulator from the sensing coil have the predetermined polarization.

9. The method of claim 8, including the step of forming the optical waveguide in a substrate of lithium niobate.

10. The method of claim 8, further including the steps of mounting the first and second polarizing means and the phase modulator on the lithium niobate substrate adjacent the optical waveguide with the phase modulator being between the first and second polarizing means.

11. The method of claim 8 including the step of forming the sensing loop to comprise ordinary single mode, non-polarization maintaining fiber.

12. A method of forming a Sagnac ring rotation sensor, comprising the steps of:
providing an optical signal source;
forming a polarization maintaining module to include an integrated optics waveguide;
introducing signals from the optical signal source into the integrated optics waveguide;
providing an unpolarized optical clockwise beam and an unpolarized counterclockwise beam output from the integrated optics waveguide; and
means for modulating a single polarization component of light in the integrated optics waveguide;
connecting a coil of non-polarization maintaining optical fiber as a sensing coil to the integrated optics waveguide to receive the polarized optical clockwise beam and the unpolarized counterclockwise beam; and
detecting interference between the clockwise beam and the counterclockwise beam to measure rotation of the coil.

13. A method of forming a Sagnac ring rotation sensor, comprising the steps of:
providing an optical signal source;
introducing signals from the optical signal source into a polarization maintaining module;
providing an unpolarized optical clockwise beam and an unpolarized counterclockwise beam output from the polarization maintaining module;
modulating a predetermined polarization component of light in the polarization maintaining module;
connecting a coil of non-polarization maintaining optical fiber as a sensing coil to the polarization maintaining module to receive the unpolarized optical clockwise beam and the unpolarized counterclockwise beam;
detecting interference between the clockwise beam and the counterclockwise beam to measure rotation of the coil;
forming the polarization maintaining module to include a length of a first polarization maintaining optical fiber having a pair of principal axes;
providing an optical signal to the first polarization maintaining optical fiber, the optical signal having a first linear polarization component parallel to one of the principal axes of the first polarization maintaining optical fiber and a second linear polarization component parallel to the other principal axis;

placing a first polarizer that passes light polarized along a first polarization axis and attenuates other polarizations adjacent the first length of polarization maintaining optical fiber;

orienting the first polarization axis at a 45° angle to the principal axes of the first polarization maintaining optical fiber;

coupling optical signals between the first polarization maintaining optical fiber and a length of a second polarization maintaining fiber, the second polarization maintaining fiber having principal axes that are parallel to the principal axes of the first polarization maintaining optical fiber, light coupled into the second polarization maintaining fiber forming a counterclockwise beam and light remaining in first polarization maintaining optical fiber forming a clockwise beam;

coupling signals from the first polarization maintaining fiber into an optical waveguide having principal axes oriented at an angle of 45° to the principal axes of second polarization maintaining fiber;

coupling signals from the optical waveguide into a third length of polarization maintaining optical fiber; and modulating the phase of light having a predetermined polarization in the optical waveguide.

14. The method of claim 13, further including the steps of:

polarizing the counterclockwise beam in the optical waveguide such that signals incident upon the phase modulator from the second polarization maintaining fiber have the predetermined polarization;

connecting a loop of optical fiber between the optical waveguide and the first polarization maintaining optical fiber to provide a sensing coil for the clockwise beam and the counterclockwise beam; and polarizing the counterclockwise beam in the optical waveguide such that signals incident upon the phase modulator from the sensing coil have the predetermined polarization.

15. The method of claim 14, including the step of forming the optical waveguide in a substrate of lithium niobate.

16. The method of claim 15, further including the steps of mounting the first and second polarizing means and the phase modulator on the lithium niobate substrate adjacent the optical waveguide with the phase modulator being between the first and second polarizing means.

17. The method of claim 12 including the step of forming the sensing loop to comprise ordinary single mode, non-polarization maintaining fiber.

18. A Sagnac ring rotation sensor, comprising:

a length of optical fiber for forming a sensing coil;

means for introducing a first optical signal having a predetermined polarization into the sensing coil, the first optical signal having a first direction of propagation around the sensing coil;

means for introducing a second optical signal into the sensing coil, the second optical signal being unpolarized and having a direction of propagation opposite to the direction of propagation of the first optical signal including:

a length of a second polarization maintaining fiber coupled to the first polarization maintaining optical fiber to receive optical signals therefrom:

means connected between the second polarization maintaining fiber and the sensing coil for depolarizing the optical signals guided by the second polarization maintaining fiber toward the sensing coil; and means for combining the first and second optical signals to produce an interference pattern indicative of rotation of the sensing coil.

19. The rotation sensor of claim 18 wherein the sensing coil comprises non-polarization maintaining optical fiber.

20. The rotation sensor of claim 18 wherein the means for introducing the first optical signal into the sensing coil comprises:

a first polarization maintaining optical fiber coupled to the sensing coil;

means for introducing an optical signal into the first polarization maintaining optical fiber; and first means for polarizing the optical signal guided by the first polarization maintaining fiber so that light incident upon the sensing coil from the first polarization maintaining fiber has a predetermined polarization.

21. The rotation sensor of claim 18 wherein the depolarizing means comprises:

a third polarization maintaining optical fiber coupled to the sensing coil, the optical signal having a predetermined depolarization length in the third polarization maintaining optical fiber, the length of the third polarization maintaining optical fiber being greater than the depolarization length;

an optical waveguide positioned to guide signals between the second polarization maintaining fiber and the third polarization maintaining fiber;

means for modulating the phase of light having a predetermined polarization in the optical waveguide; and second polarizing means mounted between the second polarization maintaining fiber and the phase modulator for polarizing light guided by the optical waveguide toward the phase modulator.

22. The rotation sensor of claim 21 wherein optical signals guided from the sensing coil to the second polarization maintaining fiber have a predetermined depolarization length in the second polarization maintaining optical fiber, and the length of the second polarization maintaining optical fiber is greater than the depolarization length.

23. The rotation sensor of claim 21 wherein the means for introducing the first optical signal into the sensing coil comprises:

a first polarization maintaining optical fiber coupled to the sensing coil;

means for introducing an optical signal into the first polarization maintaining optical fiber; and first means for polarizing the optical signal guided by the first polarization maintaining fiber so that light incident upon the sensing coil from the first polarization maintaining fiber has a predetermined polarization.

24. The rotation sensor of claim 23 wherein:

the first polarization maintaining optical fiber has a first pair of principal axes and the first polarizing means has a polarization axis oriented at an angle of about 45° to the principal axes of first polarization maintaining optical fiber;

the second polarization maintaining fiber has a second pair of principal axes parallel to the first pair of principal axes;

the optical waveguide has waveguide principal axes oriented at angles of about 45° to the second pair of principal axes; and the third polarization maintaining optical fiber has a third pair of principal axes oriented at an angle of about 45° to the waveguide principal axes.

25. A Sagnac ring rotation sensor, comprising:
an optical signal source;
a coil of non-polarization maintaining optical fiber forming a sensing coil;
means for forming a clockwise optical beam having a predetermined polarization in the sensing coil;
an integrated optics module arranged to receive signals from the optical signal source and the sensing coil, the integrated optics module including:
an integrated optics waveguide formed therein;
means for forming an unpolarized counterclockwise beam in the integrated optics waveguide for input to the sensing coil; and
means formed in the integrated optics waveguide for modulating polarization components of each of the clockwise and counterclockwise beams having only the predetermined polarization of the clockwise beam; and
means for detecting interference between the clockwise beam and the counterclockwise beam to measure rotation of the coil.

26. A method for forming a Sagnac ring rotation sensor, comprising the steps of:
forming a sensing coil from a loop of optical fiber;
connecting a first polarization maintaining optical fiber to the sensing coil;
introducing a first optical signal having a predetermined polarization into the sensing coil, the first optical signal having a first direction of propagation around the sensing coil, by a method including the steps of:
coupling a first polarization maintaining optical fiber to the sensing coil;
introducing an optical signal into the first polarization maintaining optical fiber;
polarizing the optical signal guided by the first polarization maintaining fiber so that light incident upon the sensing coil from the first polarization maintaining fiber has a predetermined polarization;
introducing into the sensing coil a second unpolarized optical signal having a direction of propagation opposite to the direction of propagation of the first optical signal by a method that includes the steps of:
forming a second polarization maintaining fiber to have a depolarization length greater than the depolarization length of optical signals propagating therein:
coupling optical signals between the second polarization maintaining fiber and the first polarization maintaining optical fiber; and
depolarizing the optical signals guided by the second polarization maintaining fiber toward the sensing coil by a method including the steps of:
coupling a third polarization maintaining optical fiber to the sensing coil, the optical signal having a predetermined depolarization length in the third polarization maintaining optical fiber, the length of the third polarization maintaining optical fiber being greater than the depolarization length:
placing an optical waveguide to guide signals between the second polarization maintaining fiber and the third polarization maintaining fiber:
modulating the phase of light having a predetermined polarization in the optical waveguide:
mounting second polarizing means between the second polarization maintaining fiber and the phase modulator for polarizing light guided by the optical waveguide toward the phase modulator:
combining the first and second optical signals to produce an interference pattern indicative of rotation of the sensing coil:
aligning the principle axes of the first polarization maintaining optical fiber at an angle of about 45° to the principal axes of the polarizing means;
aligning the principal axes of the second polarization maintaining optical fiber parallel to the principal axes of the first polarization maintaining optical fiber;
orienting the principal axes of the optical waveguide at angles of about 45° to the principal axes of the second polarization maintaining optical fiber; and
orienting the principal axes of the third polarization maintaining optical fiber at an angle of about 45° to the waveguide principal axes.

27. A method for forming a Sagnac ring rotation sensor, comprising the steps of:
forming a sensing coil from a loop of optical fiber:
connecting a first polarization maintaining fiber to the sensing coil:
introducing a first optical signal into an end of a first polarization maintaining optical fiber;
polarizing the first optical signal guided by the first polarization maintaining optical fiber;
introducing the polarized optical signal from the first polarization maintaining optical fiber into the sensing coil such that the polarized signal has a first direction of propagation around the sensing coil:
forming an optical coupler for coupling light out of the first polarization maintaining optical fiber;
introducing into the sensing coil a second optical signal which is unpolarized and which has a direction of propagation in the sensing coil opposite to the direction of propagation of the first optical signal by a method that includes the step of connecting a length of a second polarization maintaining fiber between the optical coupler and the sensing coil, the first polarization maintaining optical fiber guiding the first and second optical signals between the optical coupler to the sensing coil, the optical coupler coupling light from the first polarization maintaining optical fiber to the second polarization maintaining fiber while maintaining the polarization of the coupled light, the second polarization maintaining fiber having principal axes at angles of about 45° to the principal axes of the sensing coil; and
combining the first and second optical signals to produce an interference pattern indicative of rotation of the sensing coil:

forming an optical coupler for coupling light out of the first polarization maintaining optical fiber; and connecting a length of a second polarization maintaining fiber between the optical coupler and the sensing coil, the first polarization maintaining optical fiber guiding the first and second optical signals between the optical coupler to the sensing coil, the optical coupler coupling light from the first polarization maintaining optical fiber to the second polarizaton maintaining fiber while maintaining the polarization of the coupled light, the second polarization maintaining fiber having principle axes at angles of about 45° to the principle axes of the sensing coil.

28. A method for forming a Sagnac ring rotation sensor, comprising the steps of:

introducing an optical signal into a first length of polarization maintaining optical fiber, the optical signal having a first linear polarization component parallel to one of the principal axes of the first polarization maintaining optical fiber and a second linear polarization component parallel to the other principal axis;

placing a first polarizer that passes light polarized along a first polarization axis and attenuates other polarizations adjacent the first length of polarization maintaining optical fiber;

orienting the first polarization axis at a 45° angle to the principal axes of the first polarization maintaining optical fiber;

coupling optical signals between the first polarization maintaining optical fiber and a length of a second polarization maintaining fiber, the second polarization maintaining fiber having principal axes that are parallel to the principal axes of the first polarization maintaining optical fiber, light coupled into the second polarization maintaining fiber forming a counterclockwise beam and light remaining in first polarization maintaining optical fiber forming a clockwise beam;

coupling signals from the first polarization maintaining fiber into an optical waveguide having principal axes oriented at an angle of 45° to the principal axes of second polarization maintaining fiber;

coupling signals from the optical waveguide into a third length of polarization maintaining optical fiber; and modulating the phase of light having a predetermined polarization in the optical waveguide.

29. The method of claim 28, further including the steps of:

polarizing the counterclockwise beam in the optical waveguide such that signals incident upon the phase modulator from the second polarization maintaining fiber have the predetermined polarization;

connecting a loop of optical fiber between the optical waveguide and the first polarization maintaining optical fiber to provide a sensing coil for the clockwise beam and the counterclockwise beam; and polarizing the counterclockwise beam in the optical waveguide such that signals incident upon the phase modulator from the sensing coil have the predetermined polarization.

30. The method of claim 29, including the step of forming the optical waveguide in a substrate of lithium niobate.

31. The method of claim 29, further including the steps of mounting the first and second polarizing means and the phase modulator on the lithium niobate substrate adjacent the optical waveguide with the phase modulator being between the first and second polarizing means.

32. The method of claim 31 including the step of forming the sensing loop to comprise ordinary single mode, non-polarization maintaining fiber.

33. A method of forming a Sagnac ring rotation sensor, comprising the steps of:

providing an optical signal source;

forming an integrated optics module to have an integrated optical waveguide therein:

introducing signals from the optical signal source into a polarization maintaining module;

maintaining the state of polarization of optical signals input to the integrated optics module:

providing an unpolarized optical clockwise beam and an unpolarized counterclockwise beam output from the polarization maintaining module;

modulating a predetermined polarization component of light in the polarization maintaining module;

connecting a coil of non-polarization maintaining optical fiber as a sensing coil to the polarization maintaining module to receive the unpolarized optical clockwise beam and the unpolarized counterclockwise beam; and detecting interference between the clockwise beam and the counterclockwise beam to measure rotation of the coil.

34. A method of forming a Sagnac ring rotation sensor, comprising the steps of:

providing an optical signal source:

introducing signals from the optical signal source into a polarization maintaining module:

providing an unpolarized optical clockwise beam and an unpolarized counterclockwise beam output from the polarization maintaining module;

modulating a predetermined polarization component of light in the polarization maintaining module:

connecting a coil of non-polarization maintaining optical fiber as a sensing coil to the polarization maintaining module to receive the unpolarized optical clockwise beam and the unpolarized counterclockwise beam:

detecting interference between the clockwise beam and the counterclockwise beam to measure rotation of the coil:

forming the polarization maintaining module to include a length of a first polarization maintaining optical fiber having a pair of principal axes;

providing an optical signal to the first polarization maintaining optical fiber, the opticall signal having a first linear polarization component parallel to one of the principal axes of the first polarization maintaining optical fiber and a second linear polarization component parallel to the other principal axis;

placing a first polarizer that passes light polarized along a first polarization axis and attenuates other polarizations adjacent the first length of polarization maintaining optical fiber;

orienting the first polarization axis at a 45° angle to the principal axes of the first polarization maintaining optical fiber;

coupling optical signals between the first polarization maintaining optical fiber and a length of a second polarization maintaining fiber, the second polarization maintaining fiber having principal axes that are parallel to the principal axes of the first polarization maintaining optical fiber, light coupled into the second polarization maintaining fiber forming a counterclockwise beam and light remaining in first polarization maintaining optical fiber forming a clockwise beam;

coupling signals from the first polarization maintaining fiber into an optical waveguide having principal axes oriented at an angle of 45° to the principal axes of second polarization maintaining fiber;

coupling signals from the optical waveguide into a third length of polarization maintaining optical fiber; and modulating the phase of light having a predetermined polarization in the optical waveguide.

35. The method of claim 34, further including the steps of:

polarizing the counterclockwise beam in the optical waveguide such that signals incident upon the phase modulator from the second polarization maintaining fiber have the predetermined polarization;

connecting a loop of optical fiber between the optical waveguide and the first polarization maintaining optical fiber to provide a sensing coil for the clockwise beam and the counterclockwise beam; and polarizing the counterclockwise beam in the optical waveguide such that signals incident upon the phase modulator from the sensing coil have the predetermined polarization.

36. The method of claim 35, including the step of forming the optical waveguide in a substrate of lithium niobate.

37. The method of claim 36, further including the steps of mounting the first and second polarizing means and the phase modulator on the lithium niobate substrate adjacent the optical waveguide with the phase modulator being between the first and second polarizing means.

38. The method of claim 33, including the step of forming the sensing loop to comprise ordinary single mode, non-polarization maintaining fiber.

39. A Sagnac ring rotation sensor, comprising:

a length of a first polarization maintaining optical fiber having a pair of principal axes;

means for providing an optical signal to the first polarization maintaining optical fiber, the optical signal having a first linear polarization component parallel to one of the principal axes of the first polarization maintaining optical fiber and a second linear polarization component parallel to the other principal axis;

a first polarizer that passes light polarized along a first polarization axis and attenuates other polarizations, the first polarization axis being oriented at a 45° angle to the principal axes of the first polarization maintaining optical fiber;

an optical coupler that couples optical signals between the first polarization maintaining optical fiber and a length of a second polarization maintaining fiber, the second polarization maintaining fiber having principal axes that are parallel to the principal axes of the first polarization maintaining optical fiber, light coupled into the second polarization maintaining fiber forming a counterclockwise beam and light remaining in first polarization maintaining optical fiber forming a clockwise beam;

a third length of polarization maintaining optical fiber;

an optical waveguide positioned to guide signals between the second polarization maintaining fiber and the third polarization maintaining fiber, the optical waveguide having principal axes oriented at an angle of 45° to the principal axes of second polarization maintaining fiber;

means for modulating the phase of light having a predetermined polarization in the optical waveguide;

first polarizing means for polarizing the counterclockwise beam in the optical waveguide such that signals incident upon the phase modulator from the second polarization maintaining fiber have the predetermined polarization;

a loop of optical fiber connected between the optical waveguide and the first polarization maintaining optical fiber to provide a sensing coil for the clockwise beam and the counterclockwise beam;

second polarizing means for polaring the counterclockwise beam in the optical waveguide such that signals incident upon the phase modulator from the sensing coil have the predetermined polarization.

40. The rotation sensor of claim 39, wherein the optical waveguide is formed in a substrate of lithium niobate.

41. The rotation sensor of claim 40 wherein the first and second polarizing means and the phase modulator are mounted on the lithium niobate substrate adjacent the optical waveguide with the phase modulator being between the first and second polarizing means.

42. The rotation sensor of claim 38 wherein the sensing loop comprises ordinary single mode, non-polarization maintaining fiber.

43. A Sagnac ring rotation sensor, comprising:

a length of a first polarizaiton maintaining optical fiber having a pair of principal axes;

means for providing an optical signal to the first polarization maintaining optical fiber, the optical signal having a first linear polarization component parallel to one of the principal axes of the first polarization maintaining optical fiber and a second linear polarization component parallel to the other principal axis;

a first polarizer coupled to the first polarization maintaining fiber for passing light polarized along a first polarization axis and attenuating other polarizations, the first polarization axis being oriented at an angle of about 45° to the principal axes of the first polarization maintaining optical fiber;

a length of a second polarization maintaining fiber optically coupled to the first polarization maintaining optical fiber, the second polarization maintaining fiber having principal axes that are parallel to the principal axes of the first polarization maintaining optical fiber, light coupled into the second polarization maintaining fiber forming a counterclockwise beam and light remaining in first polarization maintaining optical fiber forming a clockwise beam;

a third length of polarization maintaining optical fiber;

a loop of optical fiber connected between the first and second polarization maintaining optical fibers to provide a sensing coil for guiding a clockwise beam and a counterclockwise beam;

an integrated optics module connected between the second polarization maintaining fiber and the third polarization maintaining fiber, the module including:

an integrated optics waveguide positioned to guide signals between second polarization maintaining fiber and the third polarization maintaining fiber, the optical waveguide having principal axes oriented at an angle of about 45° to the principal axes of second polarization maintaining fiber;

means for modulating the phase of light having a predetermined polarization in the optical waveguide; and first polarizing means for polarizing the counterclockwise beam in the optical waveguide such that signals incident upon the phase modulator from the second polarization maintaining fiber have the predetermined polarization; and second polarizing means for polarizing the counterclockwise beam in the optical waveguide such that signals incident upon the phase modulator from the sensing coil have the predetermined polarization.

44. A Sagnac ring rotation sensor, comprising:

means for providing an unpolarized optical clockwise beam and an unpolarized counterclockwise beam including:

a length of a first polarization maintaining optical fiber having a pair of principal axes;

means for providing an optical signal to the first polarization maintaining optical fiber, the optical signal having a first linear polarization component parallel to one of the principal axes of the first polarization maintaining optical fiber and a second linear polarization component parallel to the other principal axis;

a first polarizer arranged to pass light polarized along a first polarization axis in the first polarization maintaining optical fiber and attenuates other polarizations, the first polarization axis being oriented at a 45° angle to the principal axes of the first polarization maintaining optical fiber;

a length of a second polarization maintaining fiber optically coupled to the first polarization maintaining optical fiber, the second polarization maintaining fiber having principal axes that are parallel to the principal axes of the first polarization maintaining optical fiber, light coupled into the second polarization maintaining fiber forming the counterclockwise beam and light remaining in first polarization maintaining optical fiber forming the clockwise beam;

a third length of polarization maintaining optical fiber; and a polarization maintaining module arranged to receive optical signals from the optical signal source via the firstt and second polarization maintaining optical fibers, the polarization maintaining module including:

an optical waveguide positioned to guide signals between the second polarization maintaining fiber and the third polarization maintaining fiber, the optical waveguide having principal axes oriented at an angle of 45° to the principal axes of second polarization maintaining fiber;

means for modulating a predetermined polarization component;

a coil of non-polarization maintaining optical fiber forming a sensing coil connected to the means for providing an unpolarized optical clockwise beam and an unpolarized counterclockwise beam; and means for detecting interference between the clockwise beam and the counterclockwise beam to measure rotation of the coil.

45. A Sagnac ring rotation sensor, comprising:

an optical signal source;

a polarization maintaining module arranged to receive optical signals from the optical signal source, the polarization maintaining module including:

an optical waveguide;

means for providing an unpolarized optical clockwise beam and an unpolarized counterclockwise beam in the optical waveguide; and means form modulating a single polarization component in the optical waveguide;

a coil of non-polarization maintaining optical fiber forming a sensing coil connected to the means for providing an unpolarized optical clockwise beam and an unpolarized counterclockwise beam; and means for detecting interference between the clockwise beam and the counterclockwise beam to measure rotation of the coil.

46. The rotation sensor of claim 44 wherein the mean for modulating a predetermined polarization component includes:

a phase modulator for modulating the phase of light having a predetermined polarization in the optical waveguide;

first polarizing means for polarizing the counterclockwise beam in the optical waveguide such that signals incident upon the phase modulator from the second polarization maintaining fiber have the predetermined polarization; and second polarizing means for polarizing the counterclockwise beam in the optical waveguide such that signals incident upon the phase modulator from the sensing coil have the predetermined polarization.

47. The rotation sensor of claim 43 wherein the means for modulating a predetermined polarization component includes:

phase modulating means for modulating the phase of light having a predetermined polarization in the optical waveguide;

first polarizing means for polarizing the counterclockwise beam in the optical waveguide such that signals incident upon the phase modulator from the second polarization maintaining fiber have the predetermined polarization; and second polarizing means for polarizing the counterclockwise beam in the optical waveguide such that signals incident upon the phase modulator from the sensing coil have the predetermined polarization.

48. The rotation sensor of claim 43 wherein the sensing loop comprises ordinary signal mode, non-polarization maintaining fiber.

49. The rotation sensor of claim 25 or claim 43, wherein the optical waveguide is formed in a substrate of lithium niobate, the first and second polarizing means and the phase modulating means being mounted on the lithium niobate substrate adjacent the optical waveguide with the phase modulator being between the first and second polarizing means.

* * * * *